US007796519B2

(12) United States Patent
Yoshihara et al.

(10) Patent No.: US 7,796,519 B2
(45) Date of Patent: Sep. 14, 2010

(54) DYNAMIC BANDWIDTH ALLOCATION CIRCUIT, DYNAMIC BANDWIDTH ALLOCATION METHOD, OPTICAL NETWORK UNIT, PON SYSTEM, DYNAMIC BANDWIDTH ALLOCATION PROGRAM AND RECORDING MEDIUM

(75) Inventors: Osamu Yoshihara, Yachiyo (JP); Noriki Miki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1715 days.

(21) Appl. No.: 10/236,195

(22) Filed: Sep. 6, 2002

(65) Prior Publication Data
US 2003/0048805 A1 Mar. 13, 2003

(30) Foreign Application Priority Data
Sep. 10, 2001 (JP) ............................ P2001-274034
Sep. 10, 2001 (JP) ............................ P2001-274035
Sep. 10, 2001 (JP) ............................ P2001-274036

(51) Int. Cl.
*H04J 1/16* (2006.01)
(52) U.S. Cl. ........................................ 370/236; 370/468
(58) Field of Classification Search ................. 370/235, 370/395.21, 395.4, 395.42, 395.43, 411, 370/412, 413, 465, 468, 229, 231, 230.1, 370/232, 233, 234, 236
See application file for complete search history.

(56) References Cited
U.S. PATENT DOCUMENTS 5,463,620 A * 10/1995 Sriram ........................ 370/412
5,978,374 A    11/1999 Ghaibeh et al.
6,314,110 B1 * 11/2001 Chin et al. .................. 370/468
6,337,849 B1 *  1/2002 Smith et al. ................. 370/230
6,434,164 B1 *  8/2002 Matsunaga et al. .......... 370/443
6,628,616 B2 *  9/2003 Licht .......................... 370/232
6,993,044 B2 *  1/2006 McKinnon et al. .......... 370/468

(Continued)

FOREIGN PATENT DOCUMENTS
EP           0 774 848 A2      5/1997

(Continued)

OTHER PUBLICATIONS
Osamu Yoshihara et al., "Dynamic Bandwidth Allocation Algorithm for GE-PON", COIN 2002, Jul. 21-25, 2002.

(Continued)

*Primary Examiner*—Dmitry H. Levitan
*Assistant Examiner*—Dady Chery
(74) *Attorney, Agent, or Firm*—Leason Ellis LLP

(57) ABSTRACT

The aim of the present invention is to achieve a low delay and high bandwidth efficiency in an upstream bandwidth and to accurately reflect assured bandwidth in an actual transmitted bandwidth. To achieve this, in the present invention the maximum value and the transmission cycle of a requested bandwidth are set for each service class. The present invention allocates bandwidth to a service path terminating section based on excess allocated bandwidth and requested bandwidth of each service path terminating section. For each service path terminating section the present invention also selects one bandwidth out of a plurality of bandwidths requested by a service path terminating section in such a manner that the sum value of the allocated bandwidths of the plurality of service path terminating sections is within a predetermined range.

35 Claims, 21 Drawing Sheets

U.S. PATENT DOCUMENTS

| | | | |
|---|---|---|---|
| 7,065,045 B2* | 6/2006 | Jeffries et al. | 370/230 |
| 7,209,443 B2* | 4/2007 | Mukai et al. | 370/230 |
| 2002/0186710 A1* | 12/2002 | Alvesalo et al. | 370/468 |

FOREIGN PATENT DOCUMENTS

| | | |
|---|---|---|
| EP | 1 172 955 A2 | 1/2002 |
| JP | 6-69921 A | 3/1994 |
| JP | 06-334660 A1 | 12/1994 |
| JP | 7-123099 A | 5/1995 |
| JP | 10-154984 A1 | 6/1998 |
| JP | 10-290233 A1 | 10/1998 |
| JP | 10-336186 A1 | 12/1998 |
| JP | 11-041269 | 2/1999 |
| JP | 11-074908 | 3/1999 |
| JP | 11-261596 A1 | 9/1999 |
| JP | 2000-069548 A1 | 3/2000 |
| JP | 2000-115198 A | 4/2000 |
| JP | 2000-196646 A1 | 7/2000 |
| JP | 2000-209176 A1 | 7/2000 |
| JP | 2000-358041 A1 | 12/2000 |
| JP | 2001-127762 A | 5/2001 |
| JP | 2001-203737 A1 | 7/2001 |
| JP | 2001-223714 A | 8/2001 |
| JP | 2001-512939 | 8/2001 |
| JP | 2001-257701 | 9/2001 |
| JP | 2002-237825 A | 8/2002 |
| WO | WO99/07170 | 2/1999 |
| WO | WO-99/38292 A1 | 7/1999 |
| WO | WO-02/056482 A2 | 7/2002 |

OTHER PUBLICATIONS

Osamu Yoshihara et al., "GE-PON Grant/Request Method for High Bandwidth Efficiency and Low Latency", NTT Access Network Service System Laboratories, NTT Corporation, 2002, p. 414.

Osamu Yoshihara et al., "Dynamic Bandwidth Allocation Algorithm for GE-PON", The Institute of Electronics, Information and Communication Engineers, Technical Report of IEICE (Apr. 2002), pp. 4.

Notice of Reasons for Rejection for Japanese Application No. 2001-274035 mailed Oct. 11, 2005.

Notice of Reasons for Rejection for Japanese Application No. 2001-274036 mailed Oct. 11, 2005.

Manabu Yoshino et al., "System Requirements for BPON Dynamic Bandwidth Assignment", The Institute of Electronics, Information and Communication Engineers, Technical Report of IEICE. SSE2000-264, IN2000-220 (Mar. 2001).

Jongwook Jang et al, Dynamic Resource Allocation for Quality of Service on a PON with Home Networks, IEEE Communications Magazine, IEEE Service Center, New York, vol. 38, No. 6, 2000, p. 184-190.

Karasawa, Satoru, et al., "A study of the access method for bursty traffic on ATM-PON system", Technical Report of IEICE, Jun. 1997, pp. 7-12.

Shimada, Nagao, et al., "Evaluation of dynamic bandwidth allocation methods for ATM-PON system", 2000, p. 288.

Yoshino, Manabu, "Dynamic bandwidth allocation compensate allocation delay for ATM-PON", 2000, p. 204.

Abstract. Canadian Patent Application 2,214,839, Sep. 12, 1996, Oxford Brookes University.

Abstract. Canadian Patent Application No. 2,184,830, Sep. 14, 1995, Oxford Brookes University.

* cited by examiner

DYNAMIC BANDWIDTH ALLOCATION CIRCUIT, DYNAMIC BANDWIDTH ALLOCATION METHOD, OPTICAL NETWORK UNIT, PON SYSTEM, DYNAMIC BANDWIDTH ALLOCATION PROGRAM AND RECORDING MEDIUM

BACKGROUND OF THE INVENTION

1. Field of the Invention

The present invention relates to a dynamic bandwidth allocation circuit, a dynamic bandwidth allocation method, a dynamic bandwidth allocation program, and a recording medium that dynamically allocate upstream bandwidth in accordance with a bandwidth request or assured bandwidth in a network system in which a plurality of optical network units and a single optical line terminal are connected by PON topology when an upstream bandwidth from an optical network unit to an optical line terminal is shared by a plurality of optical network units or by a service path terminating section provided in the optical network units.

2. Description of the Related Art

Conventionally, in a network system in which a plurality of optical network units and a single optical line terminal are connected by PON topology, when an upstream bandwidth from an optical network unit to an optical line terminal is shared by a plurality of optical network units or by a service path terminating section, a system is known that dynamically allocates upstream bandwidth in accordance with bandwidth requests or with assured bandwidth.

FIG. 14 is a block diagram showing an example of the structure of the aforementioned network system (PON system) according to the conventional technology. Moreover, although three optical network units are shown in this figure, in the present invention and in the art related thereto, the number of optical network units is not limited to three. An optical fiber 3 that is connected to a dynamic bandwidth allocation circuit 102 of a single optical line terminal 101 is divided by an optical splitter unit 4 into a plurality of optical fibers 5a to 5c. The optical fiber 5a is connected to an optical network unit 106; the optical fiber 5b is connected to an optical network unit 107; and the optical fiber 5c is connected to an optical network unit 108. Either one or a plurality of service path terminating sections is provided in each of the optical network units 106 to 108. In FIG. 14 a service path terminating section is shown only for the optical network unit 106, however, the same applies for the structures of the other optical network units 107 and 108. The service path terminating section 109a is connected to a request source A, while the service path terminating section 109b is connected to a request source B. Consequently, it is possible to set an assured bandwidth for each request source.

A description will now be given of a conventional dynamic bandwidth allocation method in the above described PON system.

(1) Conventional Technology 1

FIG. 15 is a block diagram showing an example of the structure of an optical network unit according to conventional technology 1. FIG. 16 is a block diagram showing an example of the structure of a dynamic bandwidth allocation circuit according to the conventional technology 1. In this conventional technology the dynamic bandwidth allocation circuit 102a shown in FIG. 16 is used for the dynamic bandwidth allocation circuit 102 in FIG. 14. FIG. 17 is a sequence diagram showing an example of the transfer of bandwidth request signals and grant signals in the conventional technology 1. Note that the description given below is only for the optical network unit 106, however, the same applies for the other optical network units 107 and 108.

In the conventional technology, in the optical network unit 106 the packet data receiving sections 10a to 10c receive packet data from the corresponding request source, capacity counter sections 11a to 11c count the size of the packet data, and a capacity management section 12 manages the size of packet data in buffer memory sections 13a to 13c for each packet. For each service path terminating section a bandwidth request section 114 calculates a maximum bandwidth that is less than or equal to the maximum allocated bandwidth per single cycle for that service path terminating section and that does not cause a packet to be divided. A packet data transmission section 15 transmits bandwidth request signals that show the result of the calculation to the optical line terminal 101.

In the dynamic bandwidth allocation circuit 102a of the optical line terminal 101 a bandwidth request receiving section 20 receives and confirms bandwidth request signals during a fixed bandwidth request receiving time. Moreover, a service class classifying section 21 classifies the bandwidth request signals as signals relating to a low delay service class or as signals relating to a normal delay service class. Here, for example, a maximum delay time is defined for the service path terminating section belonging to the low delay service class, while no maximum delay time is defined for the service path terminating section belonging to the normal delay service class. Next, based on the classified bandwidth request signals, a bandwidth allocation calculation section 103 allocates bandwidth to all the service path terminating sections belonging to the low delay service class. After this allocation has ended the bandwidth allocation calculation section 103 allocates bandwidth to the service path terminating sections belonging to the normal delay service class. At this time, the allocation sequence of service path terminating sections belonging to the same class may be the same sequence for each cycle or the order may be switched each time. Note that, here, the term "allocation sequence" refers to the order of the service path terminating sections to which bandwidths are allocated. However, there are also cases in which this order and the actual order in which the allocated bandwidths are lined up (in the bandwidth request transmission cycle) are different. In addition, based on the aforementioned bandwidth request signals, the bandwidth allocation calculation section 103 calculates a transmission start time for each service path terminating section. Moreover, a grant transmission section 23 transmits grant signals that specify an allocated bandwidth and transmission start time to each service path terminating section.

According to the conventional technology, because bandwidth is normally allocated in each cycle to service path terminating sections belonging to the low delay service class prior to bandwidth being allocated to service path terminating sections belonging to the normal delay service class, it is possible to make the delay time of the former smaller than the delay time of the latter.

In the conventional technology, in order to reduce the maximum delay time of the service path terminating sections belonging to the low delay service class, it is necessary to keep the transmission cycle of the bandwidth request signals and the transmission cycle of grant signals short by reducing the amount of data transmitted in one transmission in the grant signal. However, the more the amount of data transmitted in one transmission is reduced, the more the proportion occupied by areas other than the data (namely, preamble, guard time, and the like) increases, resulting in the upstream bandwidth efficiency being lowered.

For a normal delay service class, in contrast, because there is no need to suppress the delay time, the method having the highest bandwidth efficiency should be employed as much as possible. Therefore, it is necessary to increase the amount of data transmitted in one transmission, however, this results in the transmission cycle of the grant signals being lengthened, which in turn results in the delay time of the service path terminating sections belonging to the low delay service class being increased.

In this way, in this conventional technology, under a condition in which low delay service classes and normal delay service classes are mingled together, suppressing the maximum delay time of the low delay service class and maintaining the high bandwidth efficiency of the normal delay service class are conflicting propositions, and achieving both at the same time is difficult.

(2) Conventional Technology 2

FIG. 18 is a block diagram showing an example of the structure of a dynamic bandwidth allocation circuit according to conventional technology 2. In this conventional technology, the dynamic bandwidth allocation circuit 102b is used as the dynamic bandwidth allocation circuit 102 in FIG. 14. FIG. 19 is a sequence diagram showing an example of the transfer of bandwidth request signals and grant signals in the conventional technology 2. The structure and operation of the optical network unit of this conventional technology are the same as the structure and operation of the optical network units 106 to 108 of conventional technology 1 (see FIG. 15). Note that in the description below only the optical network unit 106 is described, however, the same applies to the other optical network units 107 and 108.

In this conventional technology, using the same processing as in conventional technology 1 the optical network unit 106 transmits a bandwidth request signal to the optical line terminal 101.

In the dynamic bandwidth allocation circuit 102b of the optical line terminal 101, the bandwidth request receiving section 20 receives and confirms a bandwidth request signal within a fixed bandwidth request receiving time. Next, based on the above bandwidth request signal, a bandwidth allocation calculation section 104 calculates an allocated bandwidth and transmission start time for each service path terminating section. At this time, the allocation sequence of the service path terminating sections may be the same sequence for each cycle or the order may be switched each time. The grant transmission section 23 then transmits grant signals that specify the allocated bandwidth and transmission start time to each service path terminating section.

However, as is shown in FIG. 20, in this conventional technology, when the size of the packet data is of a variable length, because the minimum allocation unit of the data is a packet unit, if scheduling is performed by filling the allocated bandwidth of the relevant service path terminating section from the front with packet data in the buffer memory of the service path terminating section then packet data in excess of the allocated bandwidth (the packet data P6 in FIG. 20) cannot be transmitted. As a result, unused bandwidth of the maximum packet size at maximum is generated in each service path terminating section. Because the size of this unused bandwidth is different in each cycle, the actual transmitted bandwidth of each service path terminating section does not accurately reflect the assured bandwidth in each service path terminating section.

Moreover, in this conventional technology a maximum value and a minimum value are set for the length of each single cycle. This is in order, for example, to reduce the upstream transmission delay. Because the upstream transmission delay is closely connected with the transmission cycle of the bandwidth request signals and with the transmission cycle of the grant signals, in order to reduce the upstream transmission delay it is necessary to restrict the length of a single cycle to not more than a certain maximum value. However, the minimum value for the length of one cycle is the sum value of the bandwidth request receiving time, the processing time of the dynamic bandwidth allocation circuit 102b, the reciprocal propagation time of optical signals between the optical network unit 106 and the optical line terminal 101, and the processing time in the optical network unit 106. It is not possible in principle to shorten the length of a single cycle to less than this sum value. Namely, the setting of a maximum value and minimum value for the length of a cycle is effective for achieving a low delay.

FIG. 21 is a conceptual view showing an example of the structure of a frame in conventional technology 2. The bandwidth allocation calculation section 104 allocates bandwidth to service path terminating sections in accordance with the allocation sequence of the current cycle. When the sum value of the allocated bandwidth exceeds the maximum value of the total allocated bandwidth, the only bandwidth allocated for the service path terminating section that is at the tail of the allocation sequence is that from which bandwidth that has already been allocated to other service path terminating sections has already been subtracted from out of the total allocated bandwidth. Note that, here, the term "total allocated bandwidth" refers to the bandwidth remaining when the bandwidth request receiving time is subtracted from the bandwidth request transmission cycle. The grant transmission section 23 then transmits grant signals specifying the allocated bandwidth to each service path terminating section. The service path terminating sections that receive the grant signal transmit packet data that is less than or equal to the bandwidth allocated to that service path terminating section and that is the maximum bandwidth portion that does not cause the packet to be divided from their buffer memory.

However, in this conventional technology, when the size of the packet data is of a variable length, because the bandwidth allocated to service path terminating section that is at the tail of the allocation sequence does not reflect the information of the packet data in the buffer memory of that service path terminating section, unused bandwidth of the maximum packet size at maximum is generated by the size of the packet data, resulting in a deterioration in the upstream bandwidth utilization efficiency.

SUMMARY OF THE INVENTION

The present invention was conceived in view of the above described circumstances, and it is an aim thereof to provide a dynamic bandwidth allocation circuit, a dynamic bandwidth allocation method, a dynamic bandwidth allocation program, and a recording medium that enable a restriction of the maximum delay time in low delay service class to be achieved simultaneously with a securing of a high bandwidth efficiency in normal delay service class.

It is another aim of the present invention to provide a dynamic bandwidth allocation circuit, a dynamic bandwidth allocation method, a dynamic bandwidth allocation program, and a recording medium that enable the assured bandwidth of each service path terminating section to be accurately reflected in the actual transmitted bandwidth of each service path terminating section.

It is another aim of the present invention to provide a dynamic bandwidth allocation circuit, a dynamic bandwidth allocation method, a dynamic bandwidth allocation program, and a recording medium that enable unused bandwidth to be reduced even when the packet data size is of variable length.

It is another aim of the present invention to provide a dynamic bandwidth allocation circuit, a dynamic bandwidth allocation method, a dynamic bandwidth allocation program, and a recording medium that enable the transmission cycle of grant signals to be kept short.

The present invention is a dynamic bandwidth allocation circuit that, based on bandwidth requested by each of a plurality of service path terminating sections that belong to any of a plurality of service classes that are classified according to delay size, allocates bandwidth to each of the service path terminating sections, in which a maximum value of a requested bandwidth and a cycle at which a bandwidth is requested are set for each service class. Preferably, the present invention notifies a service path terminating section about an allocated bandwidth at a cycle that is different for each service class. Preferably, the service classes comprise a low delay service class whose maximum delay is defined and a normal delay service class whose maximum delay is not defined; and a maximum value of a bandwidth requested for a normal delay service class is larger than a maximum value of a bandwidth requested for a low delay service class; and the cycle for the normal delay service class is longer than the cycle for the low delay service class. Preferably, when the present invention allocates bandwidth to service path terminating sections belonging to the normal delay service class after having allocated bandwidth to all service path terminating sections belonging to the low delay service class, if the sum value of the allocated bandwidth is equal to or more than a predetermined value, a portion of the allocated bandwidth that exceeds the predetermined value is allocated in a subsequent cycle.

Moreover, the present invention stores excess allocated bandwidth that is bandwidth that has been allocated in excess to each of a plurality of service path terminating sections, and allocates bandwidth to each service path terminating section based on the bandwidth requested by each service path terminating section and on excess allocated bandwidth stored in the excess allocated bandwidth management section, and also calculates excess allocated bandwidth based on allocated bandwidth and ideal bandwidth in a current cycle. In the present invention the ideal bandwidth is calculated by subtracting excess allocated bandwidth of the previous cycle from a value obtained by proportionally distributing an ideal total allocated bandwidth using ratios of assured bandwidths of each service path terminating section that has requested bandwidth in the current cycle.

Moreover, the present invention stores excess allocated bandwidth that is bandwidth that has been allocated in excess to each of a plurality of service path terminating sections, measures actual transmitted bandwidth for each service path terminating section, and allocates bandwidth to each service path terminating section based on the bandwidth requested by each service path terminating section and on excess allocated bandwidth stored in the excess allocated bandwidth management section, and that also calculates excess allocated bandwidth based on actual transmitted bandwidth and allocated bandwidth in the previous cycle and allocated bandwidth and ideal bandwidth in the current cycle. In the present invention the ideal bandwidth is calculated by subtracting excess allocated bandwidth of the previous cycle from a value obtained by proportionally distributing an ideal total allocated bandwidth using ratios of assured bandwidths of each service path terminating section that has requested bandwidth in the current cycle.

Moreover, for each service path terminating section, the present invention selects one bandwidth from among a plurality of bandwidths requested by the service path terminating section such that the sum value of allocated bandwidths of the plurality of service path terminating sections is within a predetermined range. Preferably, the present invention allocates in sequence starting from the service path terminating section that is highest in an allocation sequence the maximum bandwidth, from among the plurality of bandwidths requested by the service path terminating section, and when the sum value of the allocated bandwidths is outside a predetermined range the bandwidth allocation calculation section adjusts bandwidth allocation to the service path terminating section that is last in the allocation sequence such that the sum value of the allocated bandwidths is within the predetermined range. Alternatively, the present invention allocates in sequence starting from the service path terminating section that is highest in an allocation sequence the minimum bandwidth from among the plurality of bandwidths requested by the service path terminating section, and when the sum value of the allocated bandwidths is outside a predetermined range the bandwidth allocation calculation section adjusts bandwidth allocation to the service path terminating section that is last in the allocation sequence such that the sum value of the allocated bandwidths is within the predetermined range.

According to the present invention it is possible to restrict the maximum delay time of the low delay service class at the same time as high bandwidth efficiency is achieved in the normal delay service class.

Moreover, according to the present invention it is possible to constantly approximate the average value of the allocated bandwidth in each cycle that is allocated to a particular service path terminating section to a predetermined target bandwidth (namely, a value obtained by subtracting excess allocated bandwidth of the previous cycle from a value obtained by proportionally distributing the ideal total allocated bandwidth using the ratios of the assured bandwidths of each service path terminating section that has requested bandwidth in the current cycle).

Moreover, according to the present invention it is possible to approximate the average value of an actual transmitted bandwidth in each cycle for a particular service path terminating section to a predetermined target bandwidth even if the allocated bandwidth of each service path terminating section is different from the actual transmitted bandwidth.

As a result, it is possible to accurately reflect the assured bandwidth of each service path terminating section in the actual transmitted bandwidth of each service path terminating section.

Moreover, according to the present invention it is possible to reduce unused bandwidth even the size of the packet data is of a variable length.

Moreover, according to the present invention it is possible to keep the grant signal transmission cycle short.

DESCRIPTION OF THE PREFERRED EMBODIMENTS

The embodiments of the present invention will now be described using the drawings.

(1) First Embodiment

Firstly, the first embodiment of the present invention will be described.

A. Structure

Figure 1:
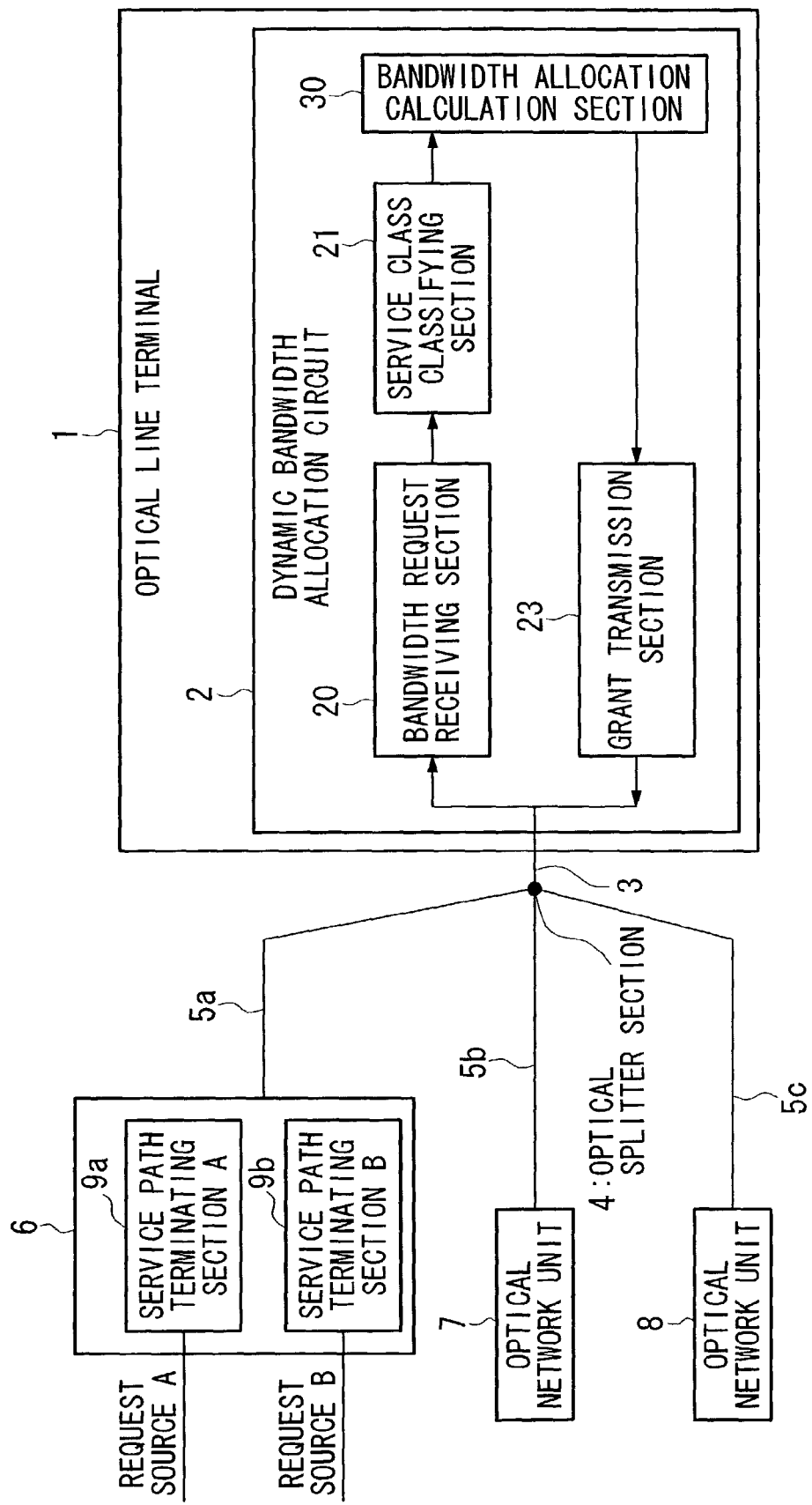
FIG. 1 is a block diagram showing an example of the structure of a PON system according to the first embodiment of the present invention.
Figure 2:
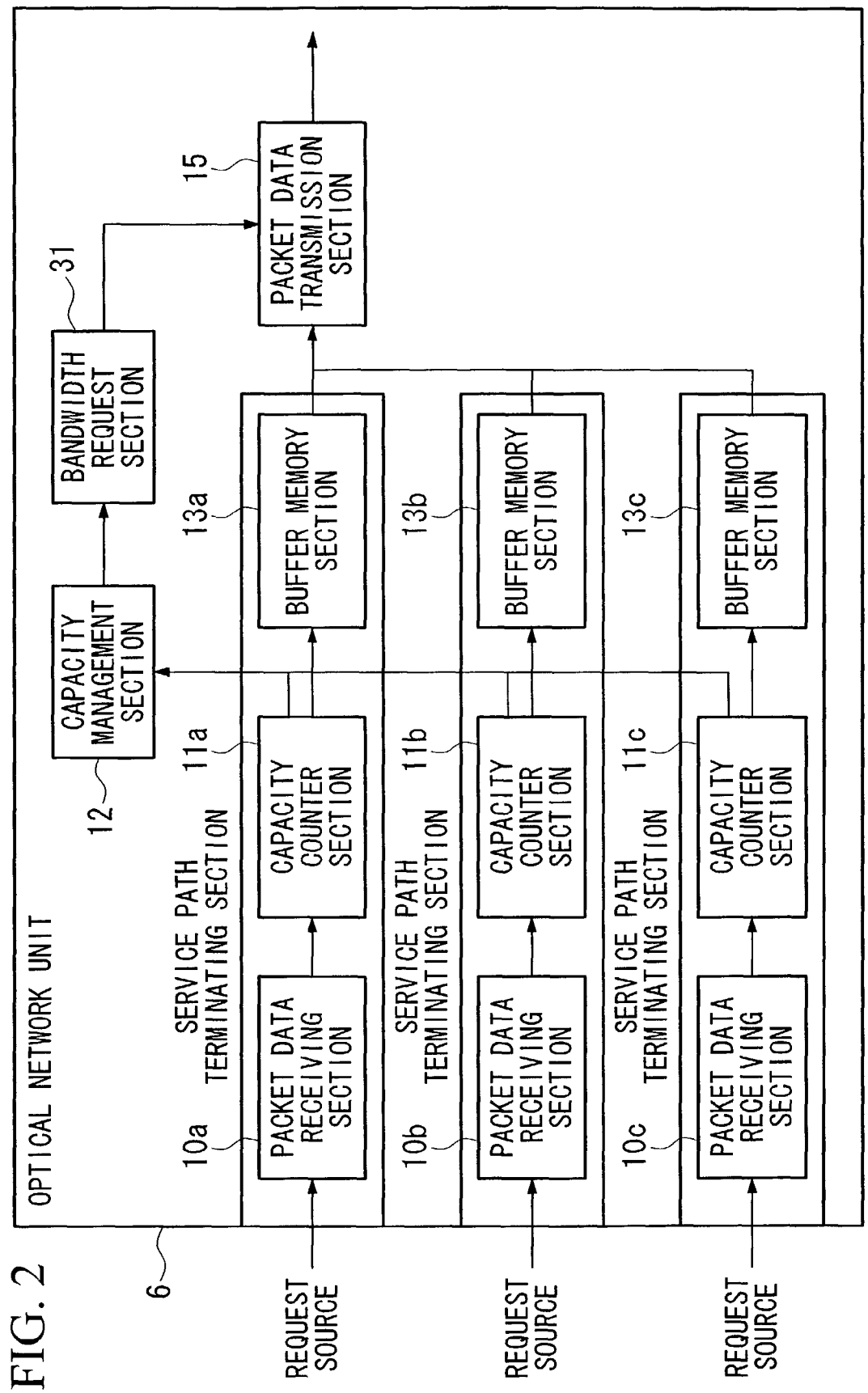
FIG. 2 is a block diagram showing an example of the structure of an optical network unit according to the first embodiment of the present invention.

FIG. 1 is a block diagram showing an example of the structure of a PON system according to the first embodiment of the present invention. FIG. 2 is a block diagram showing an example of the structure of an optical network unit according to the first embodiment of the present invention. Note that in these drawings the same descriptive symbols are given to corresponding portions that appear in FIGS. 14 to 16 and a description thereof is omitted. The structure of the present embodiment is fundamentally the same as the structure of conventional technology 1, however, a portion of the functions and operation differ in the manner described below. For each service path terminating section the bandwidth request section 31 in FIG. 2 calculates a maximum bandwidth that is less than or equal to the maximum allocated bandwidth per single cycle for that service path terminating section and that does not cause a packet to be divided. At this time, in the present embodiment, the maximum allocated bandwidth per single cycle for a service path terminating section belonging to the normal delay service class is set at a magnification of n (n>1) times the maximum allocated bandwidth per single cycle for a service path terminating section belonging to the low delay service class.

Based on the classified bandwidth request signals, the bandwidth allocation calculation section 30 of FIG. 1 calculates allocated bandwidth and transmission start time for all of the service path terminating sections belonging to the low delay service class. After this calculation is completed, the bandwidth allocation calculation section 30 calculates allocated bandwidth and transmission start time for the service path terminating sections belonging to the normal delay service class. In the present embodiment, when a bandwidth request signal is transmitted once for a normal delay service class, there are cases when the next bandwidth signal is not transmitted until the allocation of bandwidth to all of the service path terminating sections that requested bandwidth in the same cycle is completed, and cases when bandwidth request signals are transmitted in each cycle, however, in the present embodiment the former case is described. Furthermore, the transmission cycle of grant signals may also differ depending on the service class in the same way as with bandwidth request signals.

B. Operation

The operation of the present embodiment will now be described in detail.

In an optical network unit 6 packet data receiving sections 10a to 10c receive packet data from the corresponding request source; capacity counter sections 11a to 11c count the size of the packet data; and a packet management section 12 manages the sizes of the packet data in buffer memory sections 13a to 13c for each packet. Note that when packet data is received by a plurality of request sources, by adding a request source identifier to each packet data it is also possible for each packet data to be received physically by a single port, at the same time as logically each packet data is received by a different packet data receiving section for each request source. For each service path terminating section the bandwidth request section 31 calculates a maximum bandwidth that is less than or equal to the maximum allocated bandwidth per single cycle for that service path terminating section and that does not cause a packet to be divided. At this time, in the present embodiment the maximum allocated bandwidth per single cycle for a service path terminating section belonging to the normal delay service class is set at a magnification of n (n>1) times the maximum allocated bandwidth per single cycle for a service path terminating section belonging to the low delay service class. A packet data transmission section 15 transmits a bandwidth request signal that shows the result of the above calculation to the optical line terminal 1.

In a dynamic bandwidth allocation circuit 2 of the optical line terminal 1, the bandwidth request receiving section 20 receives and confirms bandwidth request signals during a fixed bandwidth request receiving time. Moreover, the service class classifying section 21 classifies the bandwidth request signals as signals relating to a low delay service class or as signals relating to a normal delay service class. Next, based on the classified bandwidth request signals, the bandwidth allocation calculation section 103 calculates an allocated bandwidth and transmission start time for all the service path terminating sections belonging to the low delay service class. After this calculation has ended the bandwidth allocation calculation section 103 calculates an allocated bandwidth and transmission start time for all the service path terminating sections belonging to the normal delay service class. Next, the grant transmission section 23 transmits grant signals that specify the allocated bandwidth and transmission start time to each service path terminating section. At this time, when a bandwidth request signal is transmitted once for a normal delay service class, there are cases when the next bandwidth signal is not transmitted until the allocation of bandwidth to all of the service path terminating sections that requested bandwidth in the same cycle is completed, and cases when bandwidth request signals are transmitted in each cycle, however, in the present embodiment the former case is described. Furthermore, the transmission cycle of grant signals may also differ depending on the service class in the same way as with bandwidth request signals. In the description below the above described operation sequence is repeated is repeated in cycles.

Figure 3:
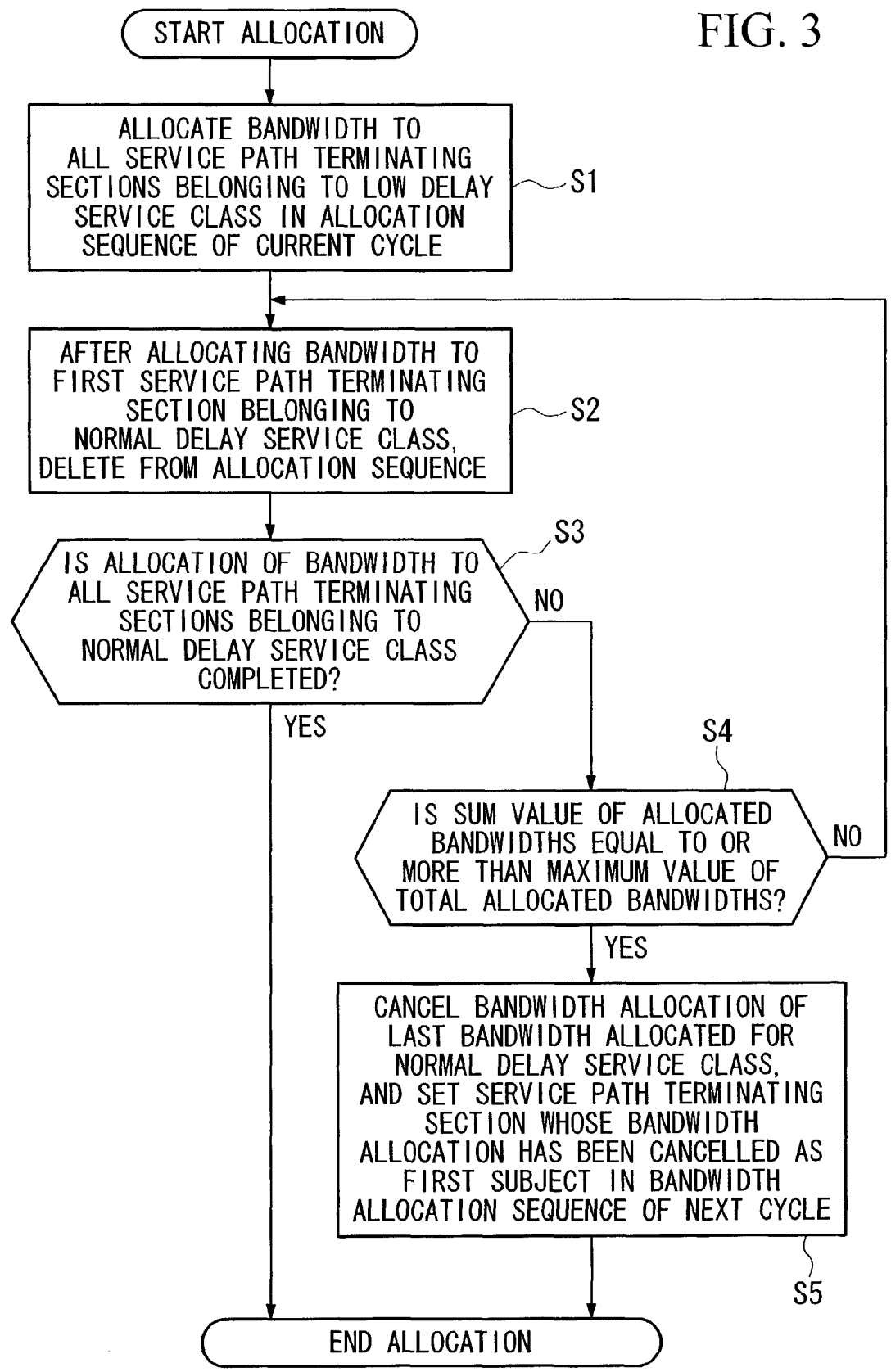
FIG. 3 is a flow chart showing an example of the operation of the bandwidth allocation calculation section according to the first embodiment of the present invention.

Next, the operation of the bandwidth allocation calculation section 30 will be described in more detail. FIG. 3 is a flow chart showing an example of the operation of the bandwidth allocation calculation section in accordance with the present embodiment. Firstly, bandwidth indicated by the bandwidth request signal relating to the relevant service path terminating section is allocated in the allocation sequence of the current cycle to all of the service path terminating sections belonging to the low delay service class (step S1). Next, after bandwidth indicated by the bandwidth request signal relating to the relevant service path terminating section has been allocated to the service path terminating section that is first in the allocation sequence from among the service path terminating sections belonging to the normal delay service class, this service path section is removed from the above sequence (step S2). Next, it is determined whether or not the allocation of bandwidths to all of the service path terminating sections belonging to the normal delay service class has been completed (step S3). If this bandwidth allocation has been completed processing in the current cycle is ended.

If, however, the above bandwidth allocation has not been completed it is determined whether or not the sum value of the allocated bandwidths is greater than or equal to the maximum value of the total allocated bandwidths (step S4). If the sum value of the allocated bandwidths is not greater than or equal to the maximum value of the total allocated bandwidths the routine returns to step S2, and the allocation of bandwidths to service path terminating sections belonging to the normal delay service class is continued. If, however, the sum value of the allocated bandwidths is greater than or equal to the maximum value of the total allocated bandwidths then the allocation of the bandwidth that was allocated last in the normal delay service class is cancelled, the service path terminating section whose allocation has been cancelled is set as the first service path terminating section in the allocation sequence in the next cycle, and the processing of the current cycle is ended (step S5).

Figure 4:
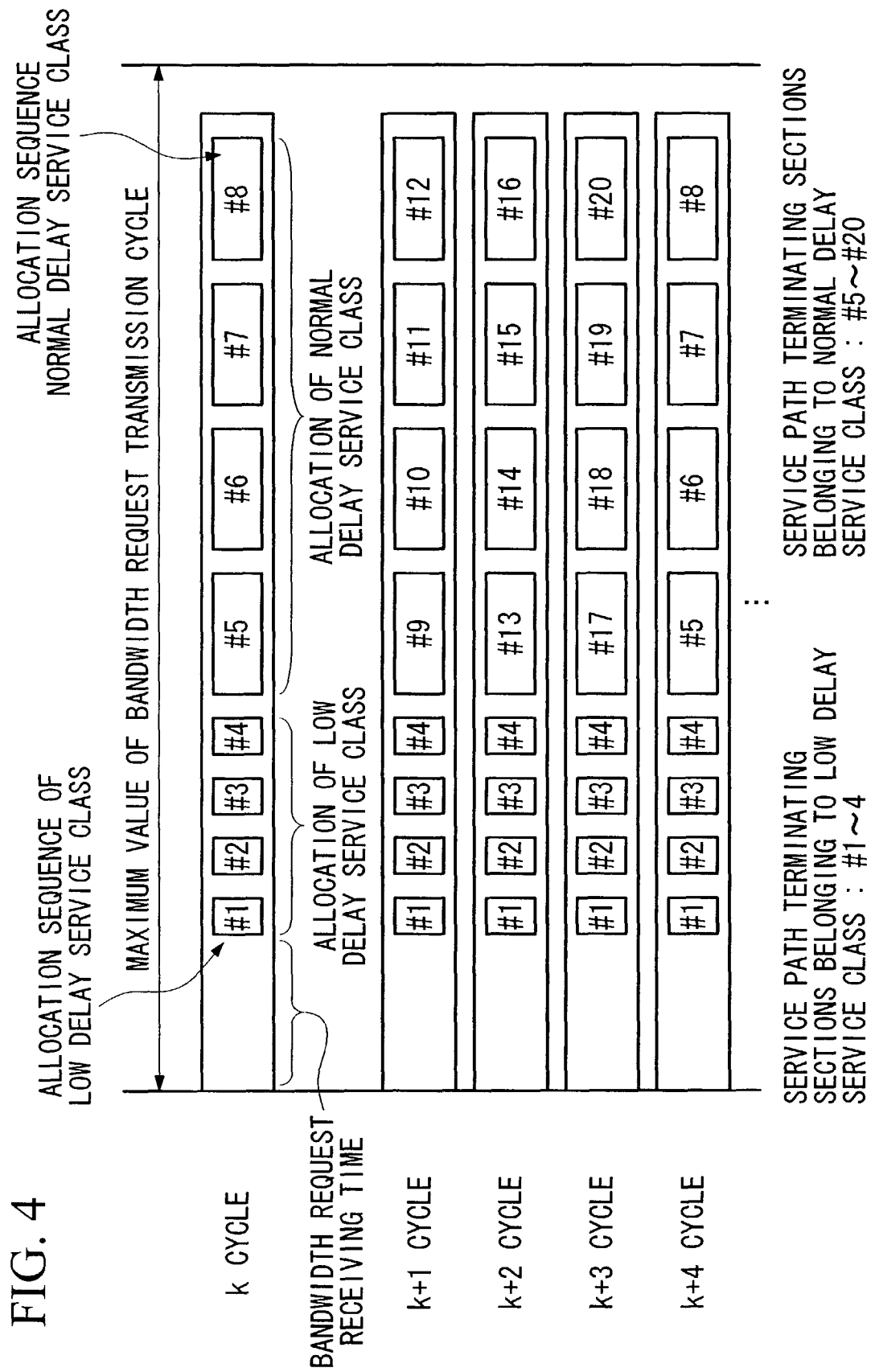
FIG. 4 is a sequence diagram showing an example of the operation of the dynamic bandwidth allocation circuit according to the first embodiment of the present invention.

Next, the operation of the dynamic bandwidth allocation circuit 2 will be described in more detail with reference to the drawings. FIG. 4 is a sequence diagram showing an example of the operation of the dynamic bandwidth allocation circuit according to the present embodiment. In the first cycle k, bandwidths are requested by both service path terminating sections belonging to the low delay service class and service path terminating sections belonging to the normal delay service class. In response, the dynamic bandwidth allocation circuit 2 allocates bandwidths in the allocation sequence of the current cycle to all of the service path terminating sections belonging to the low delay service class (cycle k: #1 to #4). After these allocations have been completed, bandwidths are allocated to the service path terminating sections belonging to the normal delay service class (cycle k: #5 to #8). At this time, if the sum value of the allocated bandwidths is greater than or equal to the maximum value of the total allocated bandwidth, then the portion of the allocated bandwidths (allocated to service path terminating sections belonging to the normal delay service class) that is in excess of the maximum value is allocated to the next cycle and thereafter. Moreover, the maximum value of the total allocated bandwidth is set such that bandwidths are allocated to all of the service path terminating sections that belong to the low delay service class and that requested bandwidth in the current cycle.

In the cycle k+1, only the service path terminating sections that belong to the low delay service class request bandwidth. In response, the dynamic bandwidth allocation circuit 2 allocates bandwidths in the allocation sequence of the current cycle to all of the service path terminating sections belonging to the low delay service class (cycle k+1: #1 to #4). After all of these allocations have been completed, bandwidths are allocated to the service path terminating sections belonging to the normal delay service class. At this time, the dynamic bandwidth allocation circuit 2 allocates bandwidth in sequence to those service path terminating sections to which bandwidth was not allocated in the cycle k (cycle k+1: #9 to #12), and if the sum value of the allocated bandwidths is greater than or equal to the maximum value of the total allocated bandwidth, then the portion of the allocated bandwidths (allocated to service path terminating sections belonging to the normal delay service class) that is in excess of this maximum value is allocated to the next cycle and thereafter.

Thereafter, the above operation is repeated. When bandwidth has been allocated to all of the service path terminating sections that belong to the normal delay service class and that requested bandwidth (cycle k+3), and in the next cycle (cycle k+4) service path terminating sections belonging to the normal delay service class also request bandwidth. In response, the dynamic bandwidth allocation circuit 2 allocates bandwidths in the allocation sequence of the current cycle to all of the service path terminating sections belonging to the low delay service class (cycle k+4: #1 to #4). After all of these allocations have been completed, bandwidths are allocated to the service path terminating sections belonging to the normal delay service class (cycle k+4: #5 to #8).

(2) Second Embodiment

The second embodiment of the present invention will now be described.

A. Structure

Figure 5:
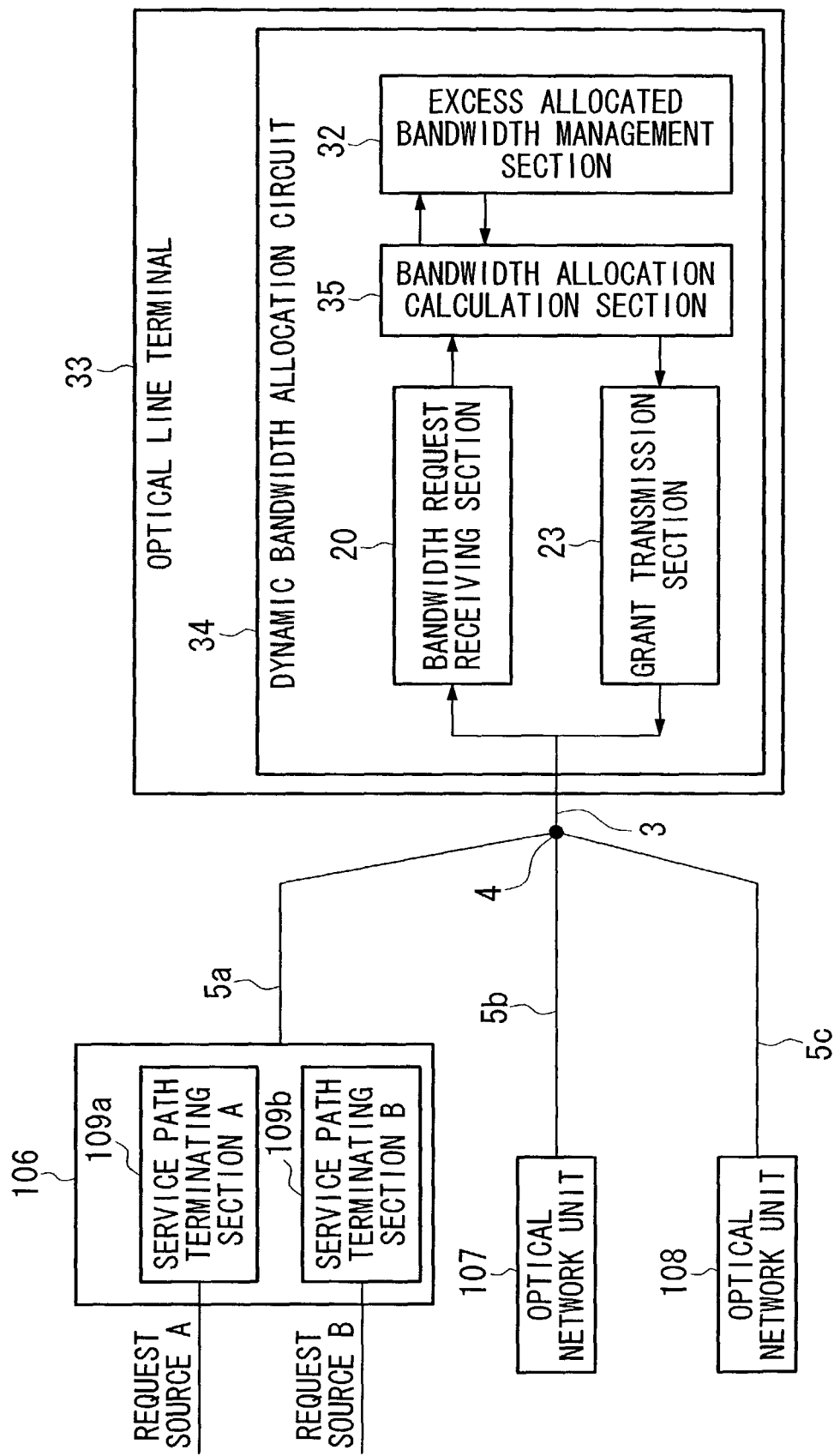
FIG. 5 is a block diagram showing an example of the structure of a PON system according to the second embodiment of the present invention.
Figure 14:
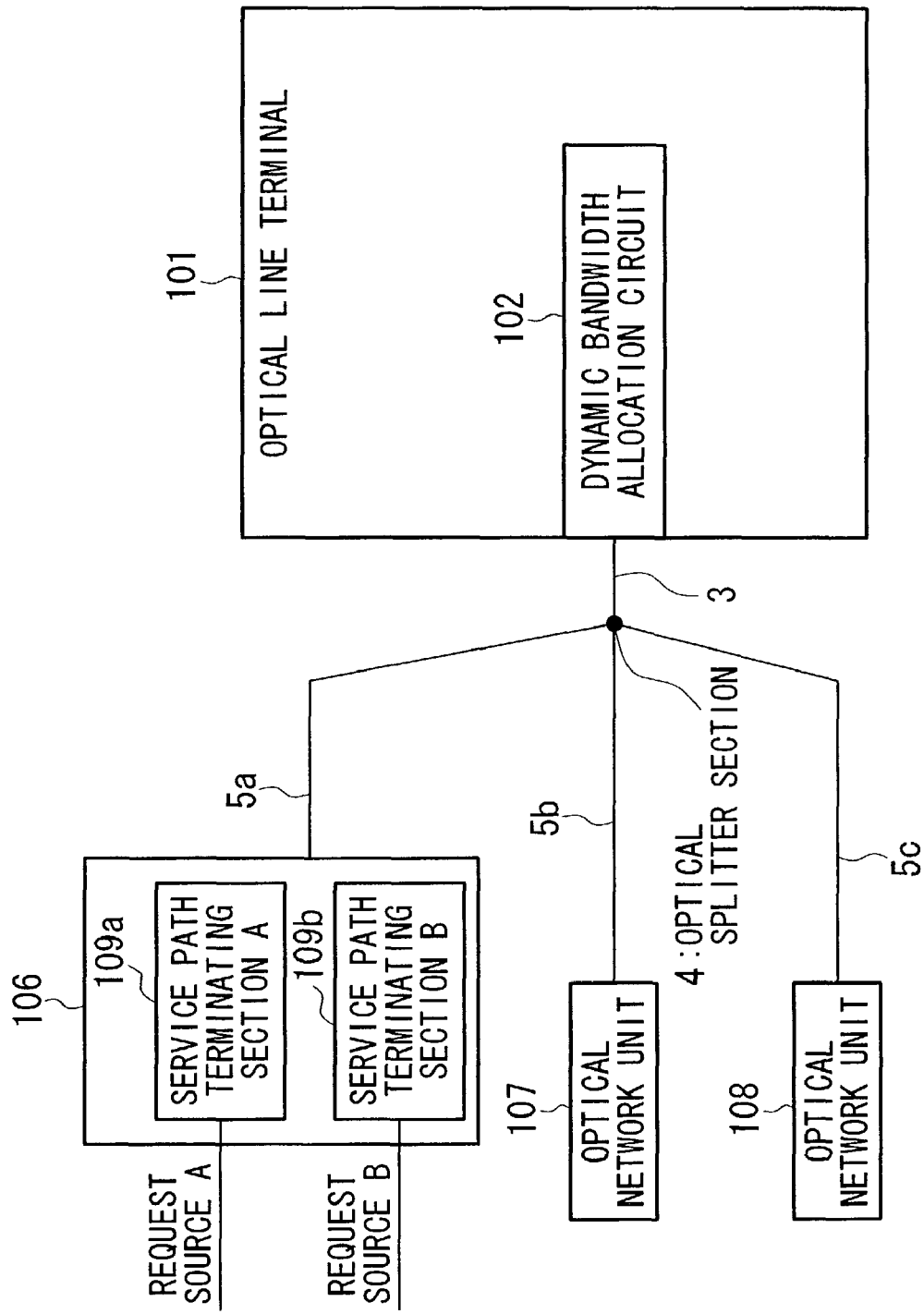
FIG. 14 is a block diagram showing an example of the structure of a PON system according to conventional technology.
Figure 15:
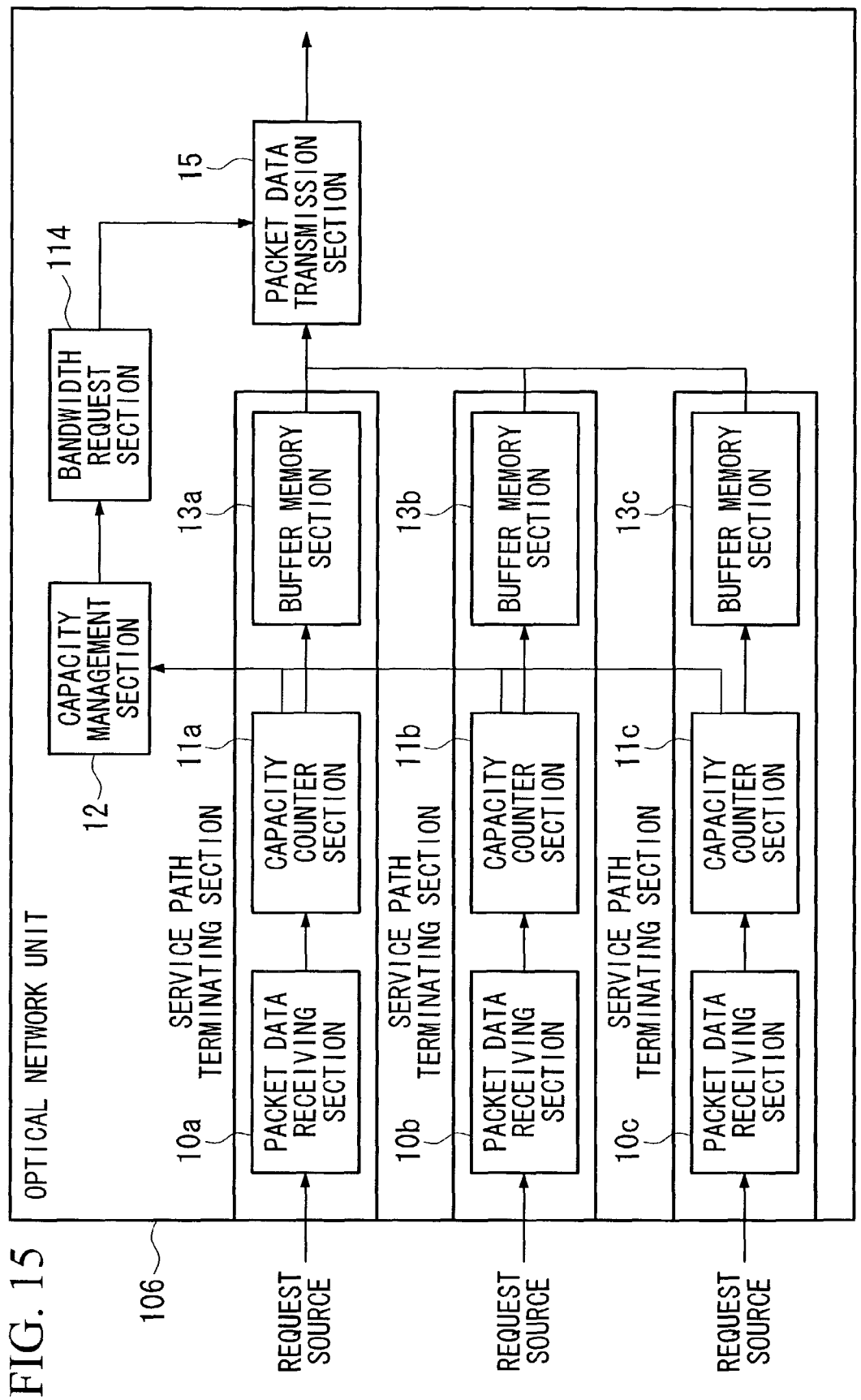
FIG. 15 is a block diagram showing an example of the structure of an optical network unit according to conventional technology 1.
Figure 16:
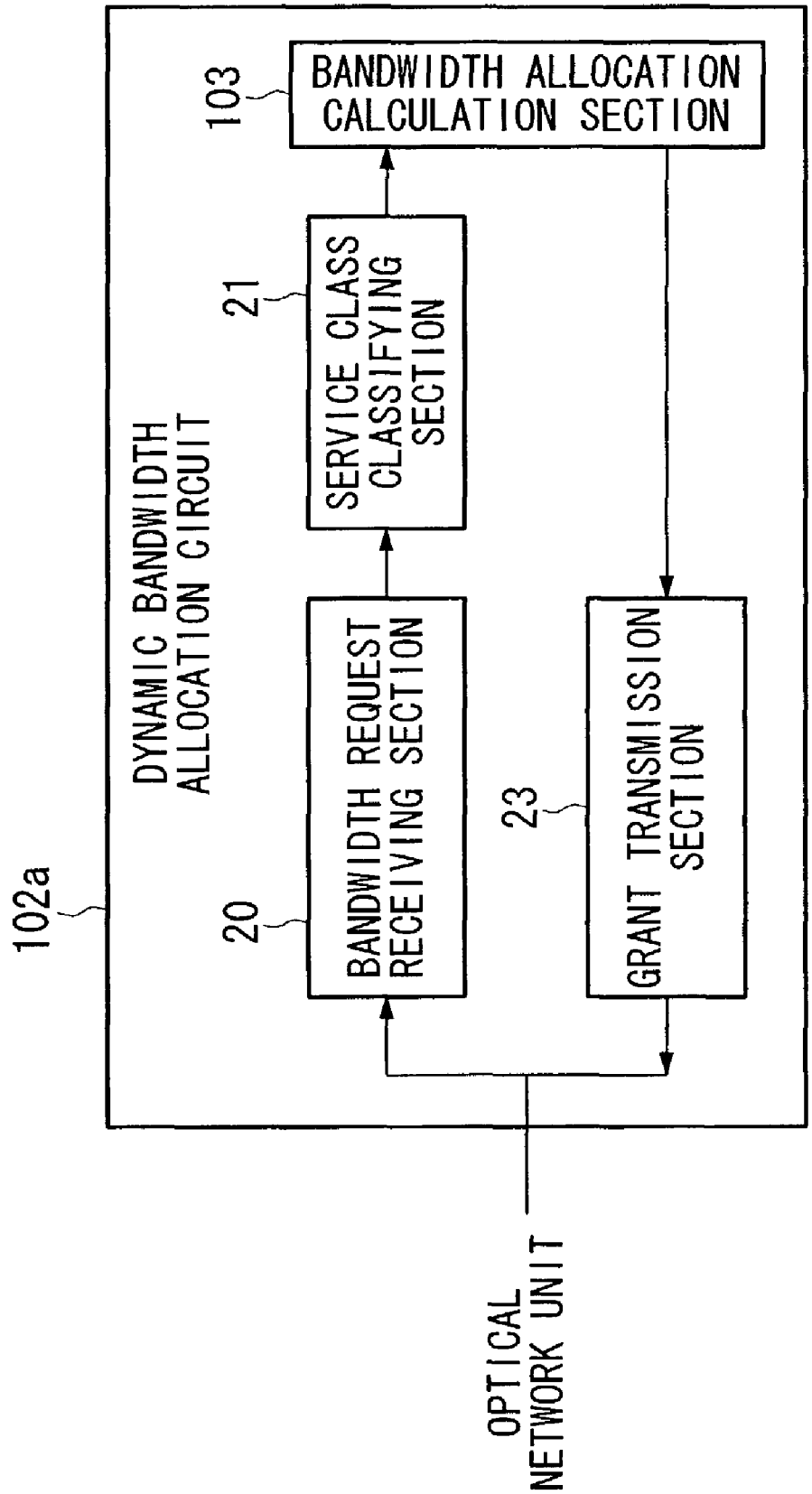
FIG. 16 is a block diagram showing an example of the structure of a dynamic bandwidth allocation circuit according to conventional technology 1.
Figure 17:
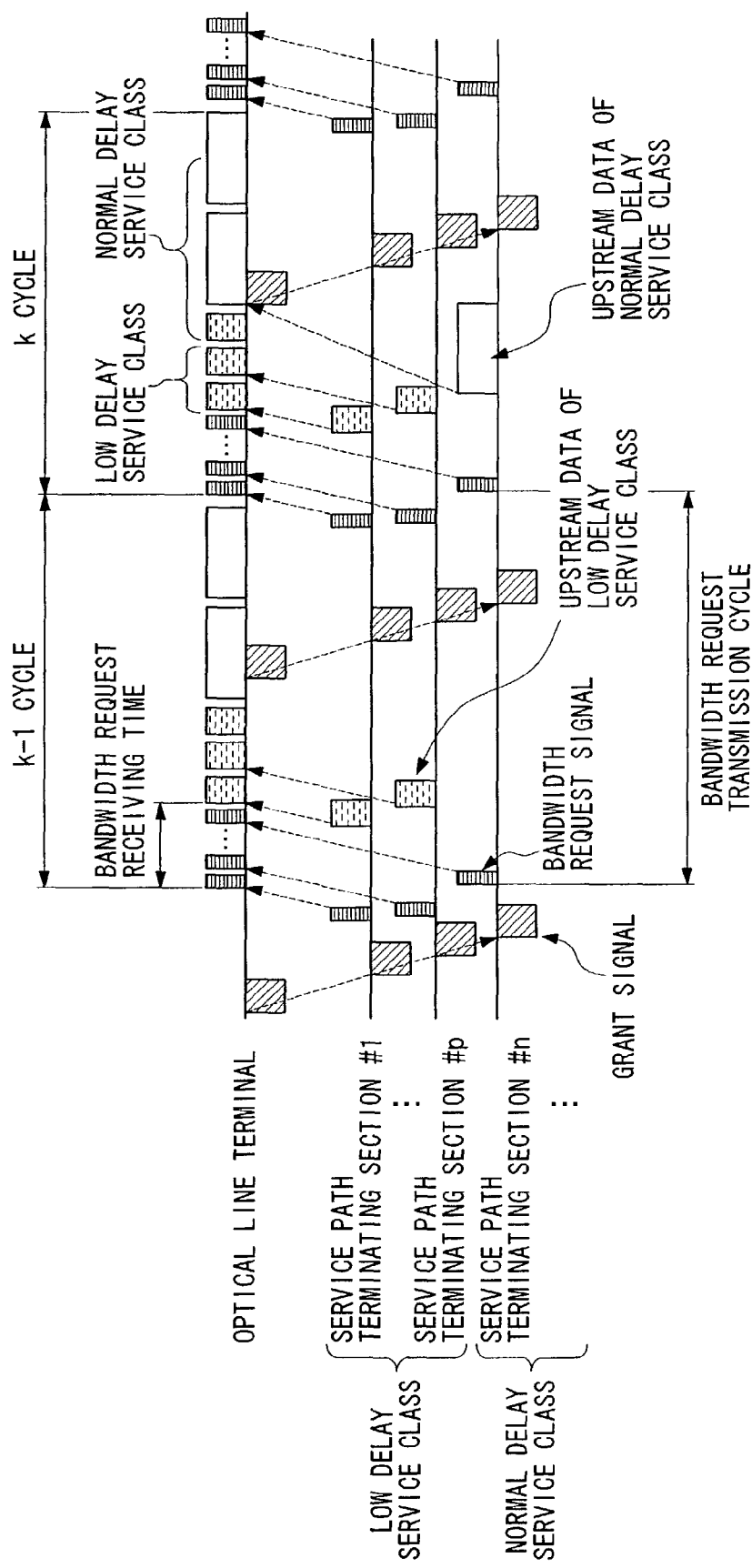
FIG. 17 is a sequence diagram showing an example of the transfer of bandwidth request signals and grant signals according to conventional technology 1.
Figure 18:
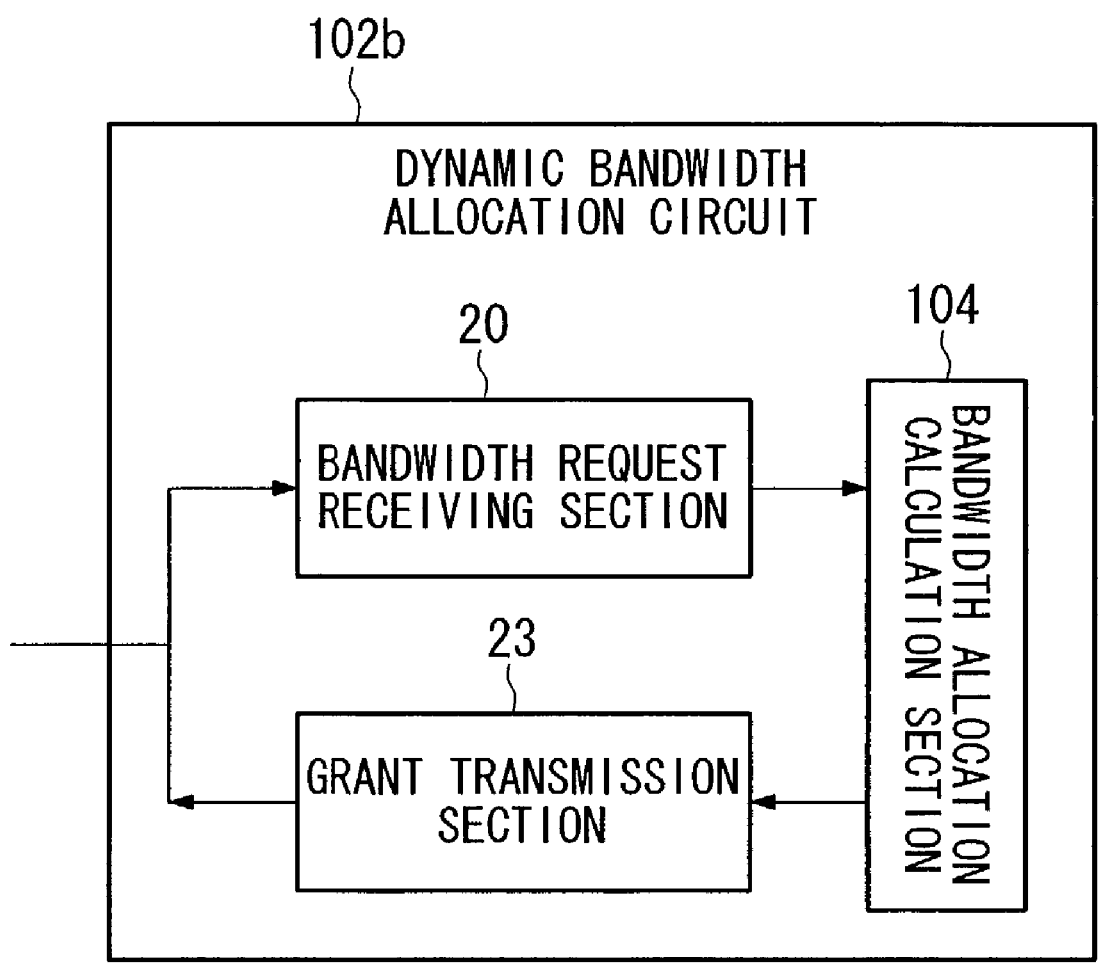
FIG. 18 is a block diagram showing an example of the structure of a dynamic bandwidth allocation circuit according to conventional technology 2.
Figure 19:
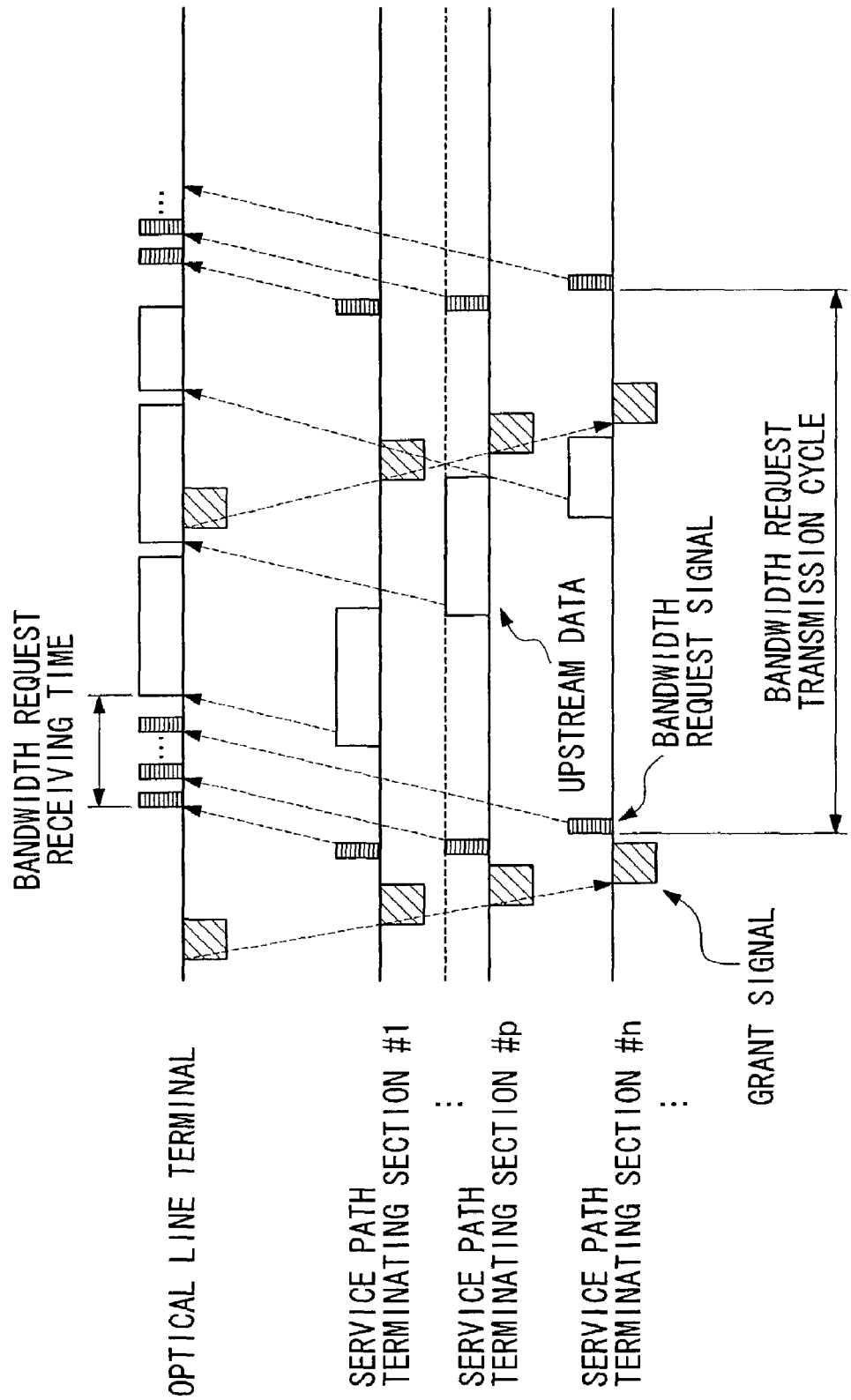
FIG. 19 is a sequence diagram showing an example of the transfer of bandwidth request signals and grant signals according to conventional technology 2.
Figure 20:
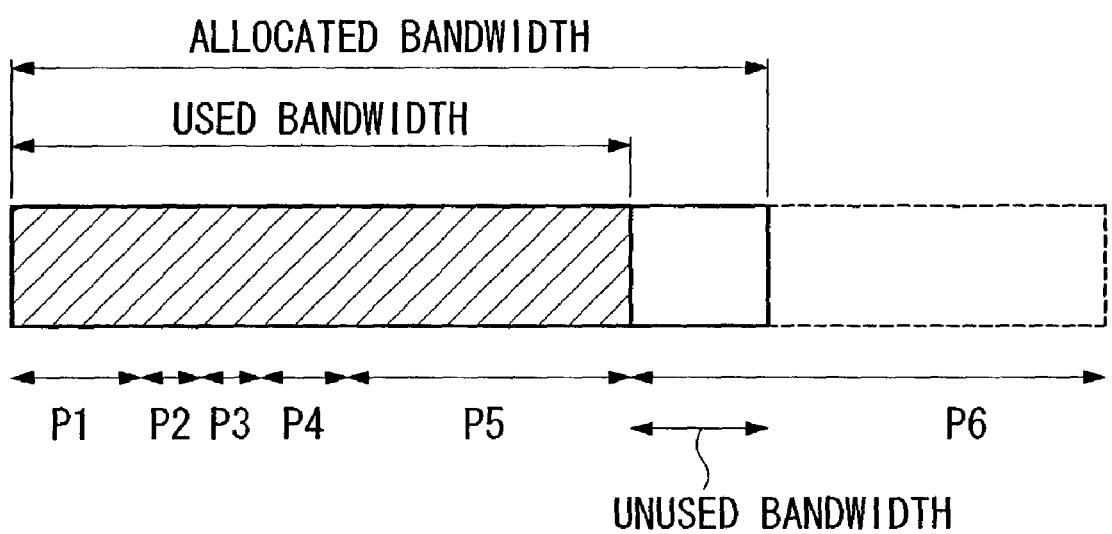
FIG. 20 is a conceptual view showing an example of an allocated bandwidth according to conventional technology 2.
Figure 21:
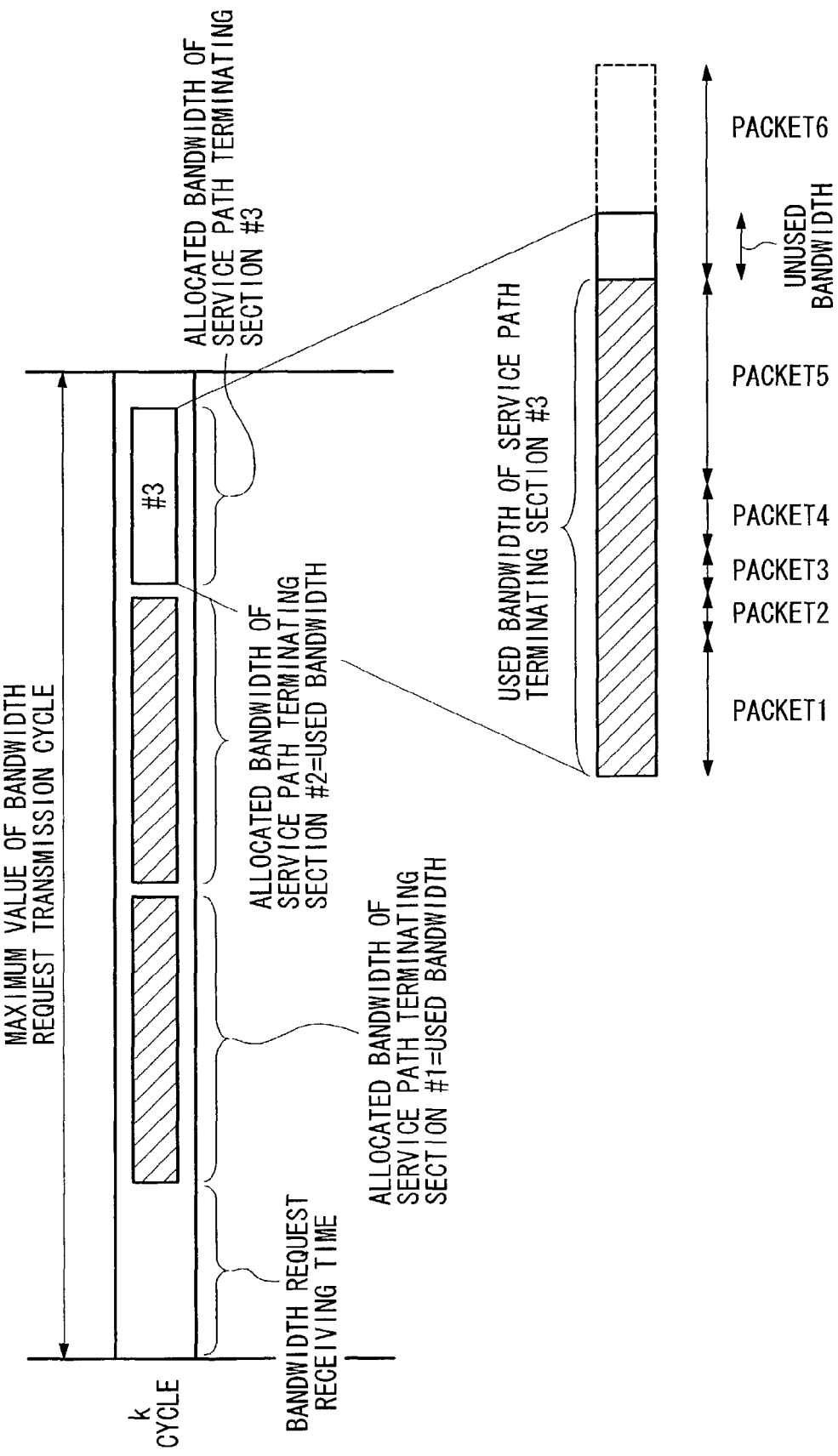
FIG. 21 is a conceptual view showing an example of a frame structure according to conventional technology 2.

FIG. 5 is a block diagram showing an example of the structure of the PON system according to the second embodiment of the present invention. Those portions of this drawing that correspond to identical portions in FIGS. 14, 15, and 18 are given the same descriptive symbols and a description thereof is omitted. The structure of this embodiment is fundamentally the same as the structure of conventional technology 2, however, a portion of the functions and operation thereof differ in the manner described below. Based on bandwidth request signals received within a fixed bandwidth request receiving time and on excess allocated bandwidth stored in an excess allocated bandwidth management section 32, a bandwidth allocation calculation section 35 calculates allocated bandwidths and transmission start times for each service path terminating section. In addition, based on the difference between allocated bandwidths and ideal bandwidths in the current cycle, the bandwidth allocation calculation section 35 calculates excess allocated bandwidth. The excess allocated bandwidth management section 32 also manages excess allocated bandwidth for each service path terminating section.

B. Operation

Next, the operation of the present embodiment will be described in detail.

Service path terminating sections of optical network units 106 to 108 receive packet data from the corresponding request source and accumulate this packet data in buffer memory (not shown) inside each service path terminating section. For each service path terminating section the optical network units 106 to 108 then transmit bandwidth request signals that show a maximum bandwidth that is less than or equal to the maximum allocated bandwidth per single cycle for that service path terminating section and that does not cause a packet to be divided to an optical line terminal 33. In a dynamic bandwidth allocation circuit 34 of the optical line terminal 33 the bandwidth request receiving section 20 receives and confirms bandwidth request signals during a fixed bandwidth request receiving time. Moreover, the excess allocated bandwidth management section 32 stores excess allocated bandwidth from the previous cycle and supplies it to the bandwidth allocation calculation section 35. Based on the above bandwidth request signal and the above excess allocated bandwidth, the bandwidth allocation calculation section 35 calculates allocated bandwidths and transmission start times for each service path terminating section. In addition, based on the difference between allocated bandwidths and ideal bandwidths in the current cycle, the bandwidth allocation calculation section 35 calculates excess allocated bandwidth. The grant transmission section 23 then transmits grant signals specifying allocated bandwidth and transmission start times to each service path terminating section. Thereafter, the above described operating sequence is repeated in cycles.

Figure 6:
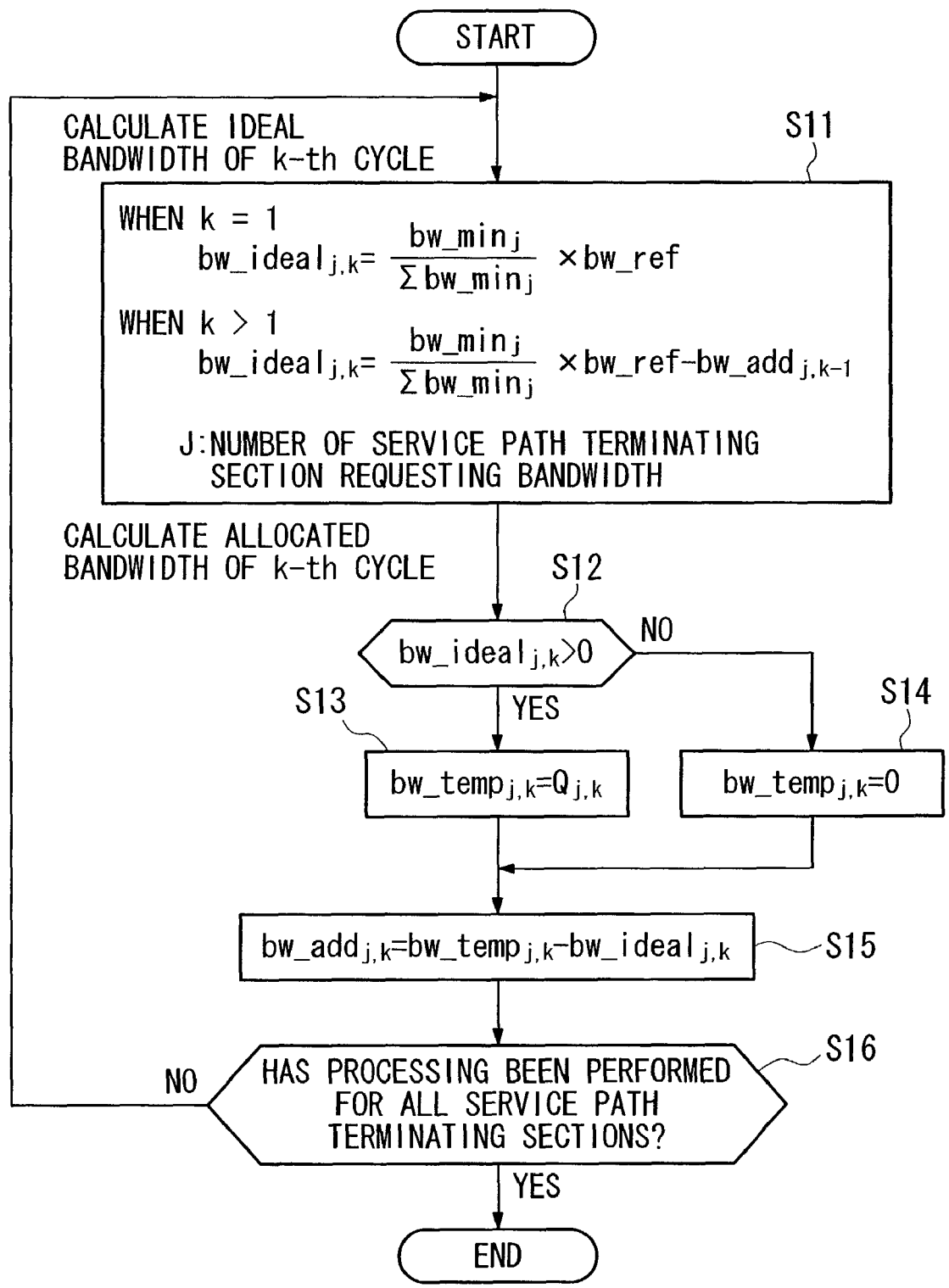
FIG. 6 is a flow chart showing an example of the operation of the bandwidth allocation calculation section according to the second embodiment of the present invention.

Next, the method of calculating allocated bandwidth by the bandwidth allocation calculation section 35 will be described. FIG. 6 is a flow chart showing an example of the operation of the bandwidth allocation calculation section according to the present embodiment. In this drawing j is the number of the service path terminating section; k is the cycle number; $bw\_temp_{j,k}$ is the allocated bandwidth of the service path terminating section j of the cycle k; $bw\_ideal_{j,k}$ is the ideal bandwidth of the service path terminating section j of the cycle k; $bw\_add_{j,k}$ is the excessive allocated bandwidth of the service path terminating section j of the cycle k; bw_ref is the sum of the ideal bandwidths of the service path terminating sections requesting bandwidth in the current cycle (referred to below as "ideal total allocated bandwidth"); $bw\_min_j$ is the assured bandwidth of the service path terminating section j; and $Q_{j,k}$ is the requested bandwidth of the service path terminating section j of the cycle k.

In the case of the first cycle (k=1), the ideal bandwidth $bw\_ideal_{j,k}$ is calculated by proportional distribution of the ideal total allocated bandwidth bw_ref using the ratios of the assured bandwidths $bw\_min_j$ of each service path terminating section that has requested bandwidth in the current cycle (step S11). Next, if the ideal bandwidth $bw\_ideal_{j,k}$ is positive, the requested bandwidth $Q_{j,k}$ is allocated to the service path terminating section j by making the allocated bandwidth $bw\_temp_{j,k}$ the requested bandwidth $Q_{j,k}$ (steps S12 and S13). If, however, the ideal bandwidth $bw\_ideal_{j,k}$ is 0 or less, by setting the allocated bandwidth $bw\_temp_{j,k}$ to 0 no bandwidth is allocated to the service path terminating section j (steps S12 and S14). Next, the excess allocated bandwidth $bw\_add_{j,k}$ is calculated by subtracting the ideal bandwidth $bw\_ideal_{j,k}$ from the allocated bandwidth $bw\_temp_{j,k}$ (step S15). The excess allocated bandwidth management section 32 stores the excess allocated bandwidth $bw\_add_{j,k}$. Next, it is determined whether or not the above processing has been performed for all the service path terminating sections (step S16). If there is a service path terminating section that has not undergone the above processing, the routine returns to step S11. If, however, the processing has been performed for all the service path terminating sections, the processing for the current cycle is ended.

The optical network units 106 to 108 then transmit packet data for the allocated bandwidth $bw\_temp_{j,k}$ allocated in step S13 or S14 to the optical line terminal 33. Note that, in the case of the second and subsequent cycles (k>1), the method for calculating the ideal bandwidth $bw\_ideal_{j,k}$ in step S11 is different from the calculation method used in the first cycle. In step S11 in the second and subsequent cycles, the ideal total allocated bandwidth bw_ref is proportionally distributed using the ratios of the assured bandwidths $bw\_min_j$ of each service path terminating section that has requested bandwidth in the current cycle, and thereafter the ideal bandwidth $bw\_ideal_{j,k}$ is calculated by subtracting the excess allocated bandwidth $bw\_add_{j,k-1}$ of the previous cycle from the result of the above proportional distribution. The processing other than this is the same as the processing of the first cycle. As a result of the above described processing it is possible to constantly approximate the average value of the allocated bandwidth $bw\_temp_{j,k}$ in each cycle allocated to a particular service path terminating section to a predetermined target bandwidth (namely, a value obtained by subtracting excess allocated bandwidth of the previous cycle from a value obtained by proportionally distributing the ideal total allocated bandwidth bw_ref using the ratios of the assured bandwidths $bw\_min_j$ of each service path terminating section that has requested bandwidth in the current cycle).

Note that, if maximum values are set for the total allocated bandwidths, when calculated allocated bandwidths are scheduled in a predetermined sequence, at the point when the allocated bandwidth at the position p in the sequence is scheduled, if the sum value of the allocated bandwidths that have been scheduled by that point exceeds the maximum value of the total allocated bandwidths of the current cycle, then it is also possible to set allocated bandwidths from the position p in the sequence onwards to 0.

(3) Third Embodiment

The third embodiment of the present invention will now be described.

A. Structure

Figure 7:
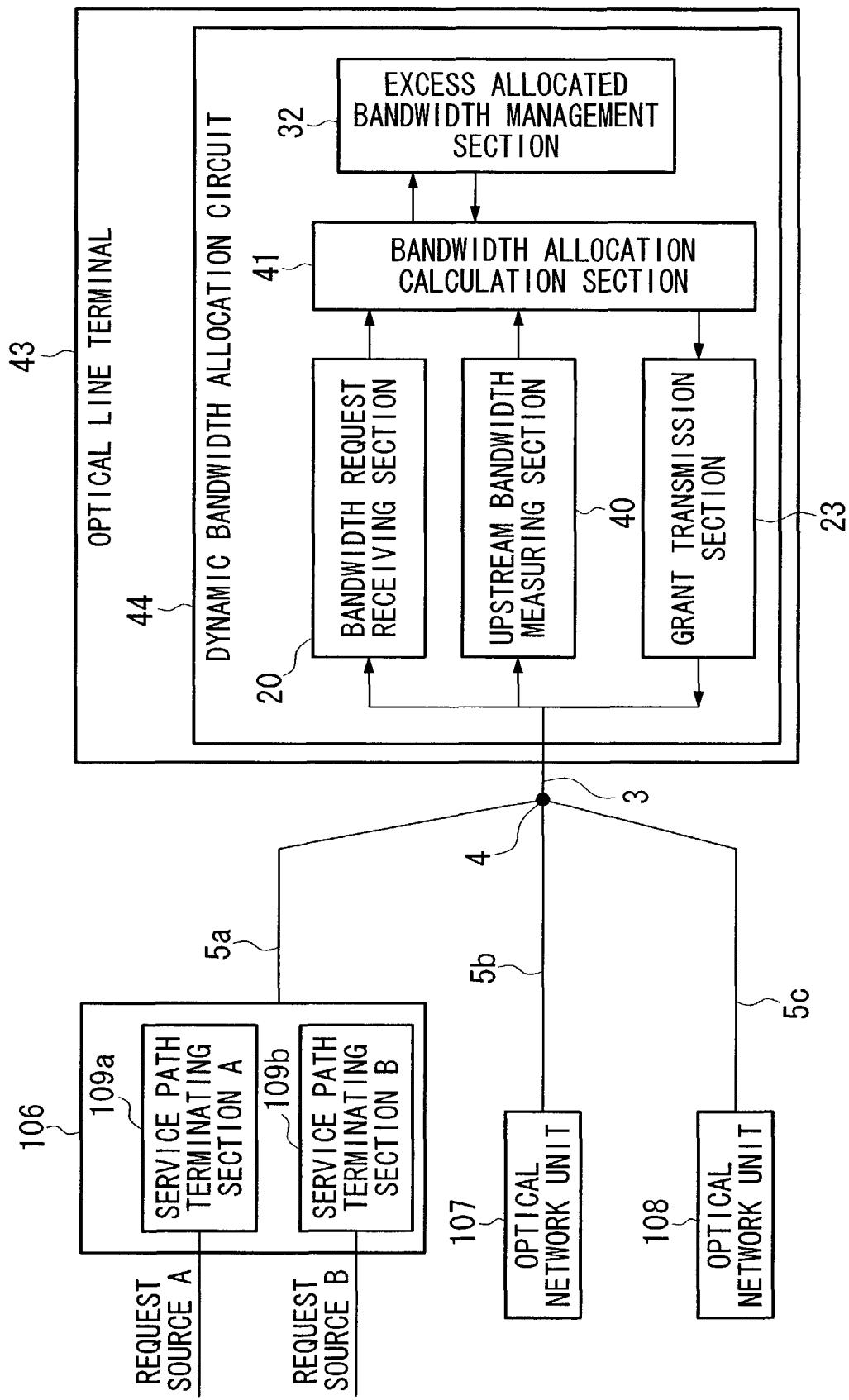
FIG. 7 is a block diagram showing an example of the structure of a PON system according to the third embodiment of the present invention.

FIG. 7 is a block diagram showing an example of the structure of the PON system according to the third embodiment of the present invention. Those portions of this drawing that correspond to identical portions in FIGS. 14, 15, and 18 are given the same descriptive symbols and a description thereof is omitted. The structure of this embodiment is fundamentally the same as the structure of conventional example 2, however, a portion of the functions and operation thereof differ in the manner described below. An upstream bandwidth measuring section 40 shown in FIG. 7 measures the actual transmitted bandwidth for each service path terminating section. Moreover, based on bandwidth request signals received within a fixed bandwidth request receiving time and on excess allocated bandwidth stored in an excess allocated bandwidth management section 32, a bandwidth allocation calculation section 41 calculates allocated bandwidths and transmission start times for each service path terminating section. In addition, based on the difference between the actual transmitted bandwidth and allocated bandwidth of the previous cycle and on the difference between allocated bandwidths and ideal bandwidths in the current cycle, the bandwidth allocation calculation section 41 calculates excess allocated bandwidth. The excess allocated bandwidth management section 32 also manages excess allocated bandwidth for each service path terminating section.

B. Operation

Next, the operation of the present embodiment will be described in detail.

Service path terminating sections of optical network units 106 to 108 receive packet data from the corresponding request source and accumulate this packet data in buffer memory (not shown) inside each service path terminating section. For each service path terminating section the optical network units 106 to 108 then transmit bandwidth request signals that show a maximum bandwidth that is less than or equal to the maximum allocated bandwidth per single cycle for that service path terminating section and that does not cause a packet to be divided to an optical line terminal 43. In a dynamic bandwidth allocation circuit 44 of the optical line terminal 43 the bandwidth request receiving section 20 receives and confirms bandwidth request signals during a fixed bandwidth request receiving time, and the upstream bandwidth measuring section 40 measures the actual transmitted bandwidth for each service path terminating section. Moreover, the excess allocated bandwidth management section 32 stores excess allocated bandwidth from the previous cycle and supplies it to the bandwidth allocation calculation section 41. Based on the above bandwidth request signal and the above excess allocated bandwidth, the bandwidth allocation calculation section 41 calculates allocated bandwidths and transmission start times for each service path terminating section. In addition, based on the difference between the actual transmitted data and the allocated bandwidths of the previous cycle and on the difference between allocated bandwidths and ideal bandwidths in the current cycle, the bandwidth allocation calculation section 41 calculates excess allocated bandwidth. The grant transmission section 23 then transmits grant signals specifying allocated bandwidth and transmission start times to each service path terminating section. Thereafter, the above described operating sequence is repeated in cycles.

Figure 8:
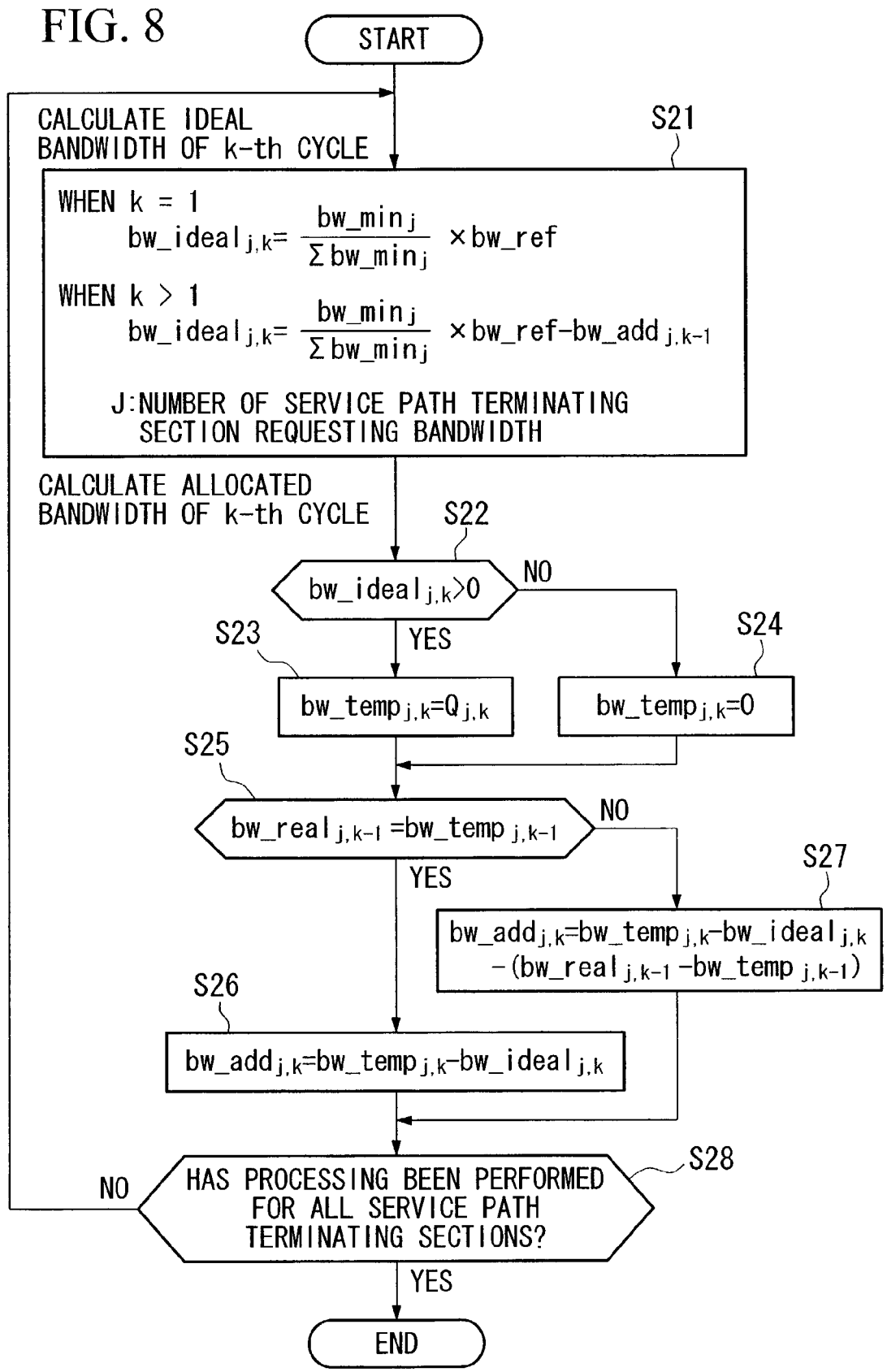
FIG. 8 is a flow chart showing an example of the operation of the bandwidth allocation calculation section according to the third embodiment of the present invention.

Next, the method of calculating allocated bandwidth by the bandwidth allocation calculation section 41 will be described. FIG. 8 is a flow chart showing an example of the operation of the bandwidth allocation calculation section according to the present embodiment. In this drawing the meaning of each symbol is the same as the meaning of each symbol given in FIG. 6. In addition, $bw\_real_{j,k}$ is the actual transmitted bandwidth of the service path terminating section j in the cycle k.

In the case of the first cycle (k=1), the ideal bandwidth $bw\_ideal_{j,k}$ is calculated by proportional distribution of the ideal total allocated bandwidth bw_ref using the ratios of the assured bandwidths $bw\_min_j$ of each service path terminating section that has requested bandwidth in the current cycle (step S21). Next, if the ideal bandwidth $bw\_ideal_{j,k}$ is positive, the requested bandwidth $Q_{j,k}$ is allocated to the service path terminating section j by making the allocated bandwidth $bw\_temp_{j,k}$ the requested bandwidth $Q_{j,k}$ (steps S22 and S23). If, however, the ideal bandwidth $bw\_ideal_{j,k}$ is 0 or less, by setting the allocated bandwidth $bw\_temp_{j,k}$ to 0 no bandwidth is allocated to the service path terminating section j (steps S22 and S24). Next, it is determined whether or not the actual transmitted bandwidth $bw\_real_{j,k-1}$ of the previous cycle is equal to the allocated bandwidth $bw\_temp_{j,k-1}$ of the previous cycle (step S25). If the two are equal, then in the same manner as in the second embodiment, the excess allocated bandwidth $bw\_add_{j,k}$ is calculated by subtracting the ideal bandwidth $bw\_ideal_{j,k}$ from the allocated bandwidth $bw\_temp_{j,k}$ (step S26). The excess allocated bandwidth management section 32 stores the excess allocated bandwidth $bw\_add_{j,k}$. If, however, the actual transmitted bandwidth $bw\_real_{j,k-1}$ of the previous cycle is different from the allocated bandwidth $bw\_temp_{j,k-1}$ of the previous cycle, the excess allocated bandwidth $bw\_add_{j,k}$ is calculated by subtracting a value that is obtained by subtracting the allocated bandwidth $bw\_temp_{j,k-1}$ of the previous cycle from the actual transmitted bandwidth $bw\_real_{j,k-1}$ of the previous cycle from a value that is obtained by subtracting the ideal bandwidth $bw\_ideal_{j,k}$ from the allocated bandwidth $bw\_temp_{j,k}$ (step S27). The excess allocated bandwidth management section 32 stores the excess allocated bandwidth $bw\_add_{j,k}$. Next, it is determined whether or not the above processing has been performed for all the service path terminating sections (step S28). If there is a service path terminating section that has not undergone the above processing, the routine returns to step S21. If, however, the processing has been performed for all the service path terminating sections, the processing for the current cycle is ended.

The optical network units 106 to 108 then transmit packet data for the allocated bandwidth $bw\_temp_{j,k}$ allocated in step S23 or S24 to the optical line terminal 43. Note that, in the case of the second cycle (k>1) and subsequent cycles, the method for calculating the ideal bandwidth $bw\_ideal_{j,k}$ in step S21 is different from the calculation method used in the first cycle. In step S21 in the second and subsequent cycles, the ideal total allocated bandwidth bw_ref is proportionally distributed using the ratios of the assured bandwidths $bw\_min_j$ of each service path terminating section that has requested bandwidth in the current cycle, and thereafter the ideal bandwidth $bw\_ideal_{j,k}$ is calculated by subtracting the excess allocated bandwidth $bw\_add_{j,k-1}$ of the previous cycle from the result of the above proportional distribution. The processing other than this is the same as the processing of the first cycle.

As a result of the above described processing, it is possible to obtain effects such as those described in the second embodiment even if the allocated bandwidth of the service path terminating section is different from the actual transmitted bandwidth of the service path terminating section.

Note that, if maximum values are set for the total allocated bandwidths, when calculated allocated bandwidths are scheduled in a predetermined sequence, at the point when the allocated bandwidth at the position p in the sequence is scheduled, if the sum value of the allocated bandwidths that have been scheduled by that point exceeds the maximum value of the total allocated bandwidths of the current cycle, then it is also possible to set the surplus bandwidth (namely, bandwidth obtained by subtracting the sum value of allocated bandwidths up to the position p−1 in the sequence from the maximum value of the total allocated bandwidth) in the current cycle to allocated bandwidth at the position p in the sequence, and to set allocated bandwidth at the position p+1 and thereafter in the sequence to 0.

(4) Fourth Embodiment

The fourth embodiment of the present invention will now be described.

A. Structure

Figure 9:
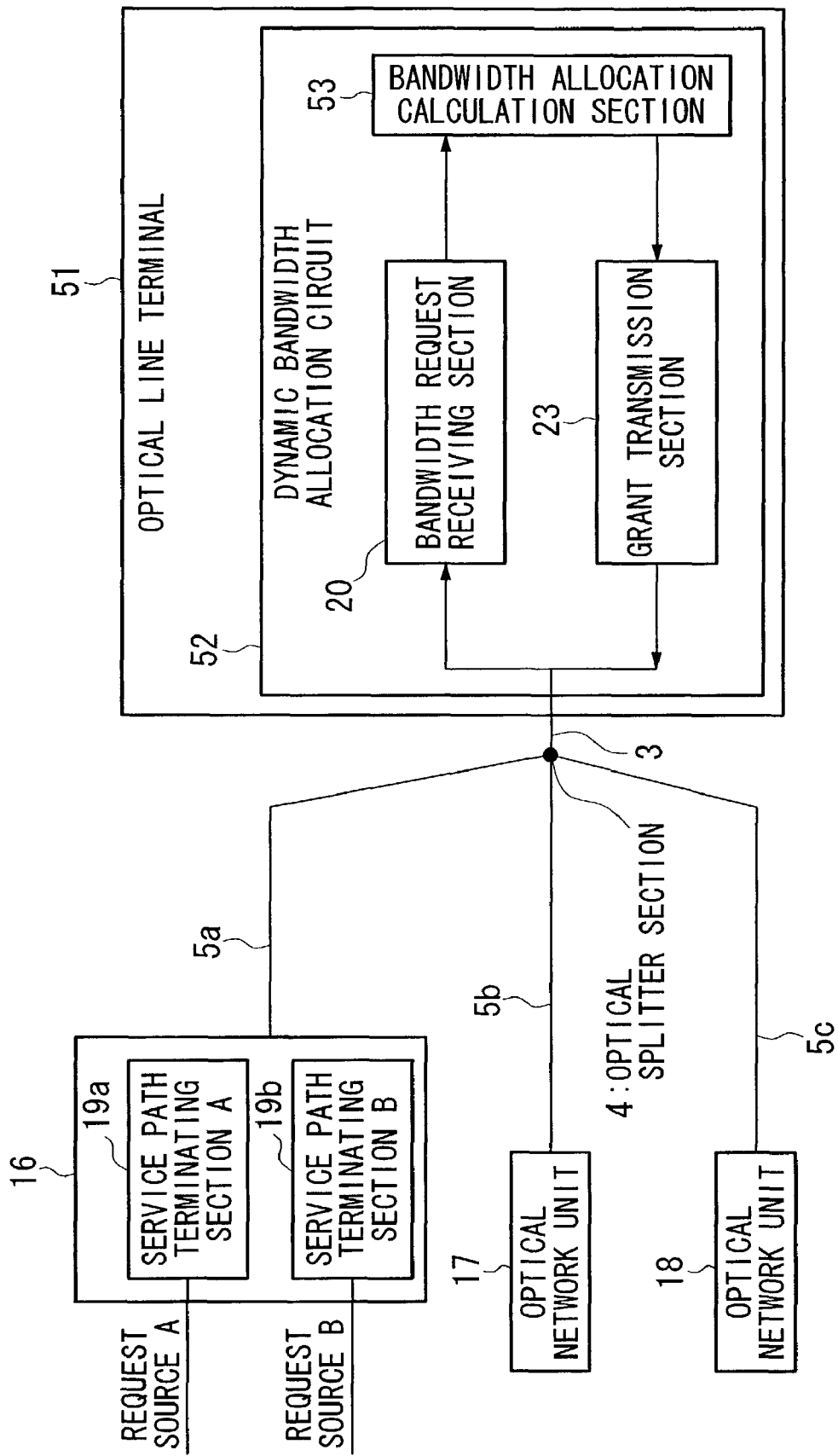
FIG. 9 is a block diagram showing an example of the structure of a PON system according to the fourth embodiment of the present invention.
Figure 10:
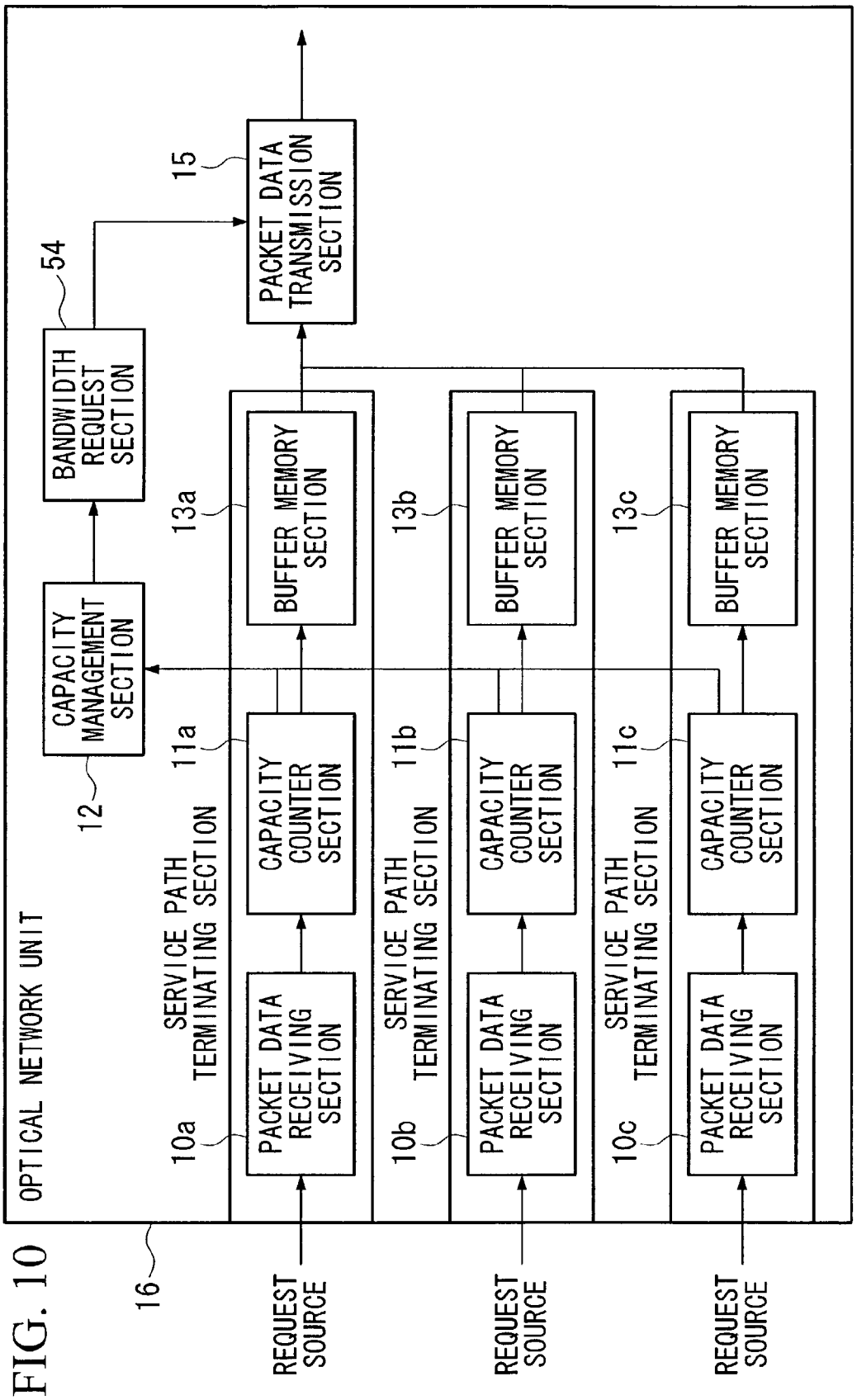
FIG. 10 is a block diagram showing an example of the structure of an optical network unit according to the fourth embodiment of the present invention.

FIG. 9 is a block diagram showing an example of the structure of the PON system according to the fourth embodiment of the present invention. FIG. 10 is a block diagram showing an example of the structure of the optical network unit according to the fourth embodiment of the present invention. Those portions of these drawings that correspond to identical portions in FIGS. 14, 15, and 18 are given the same descriptive symbols and a description thereof is omitted. The structure of this embodiment is fundamentally the same as the structure of conventional technology 2, however, a portion of the functions and operation thereof differ in the manner described below. For each service path terminating section, the bandwidth request section 54 in FIG. 10 calculates as a requested bandwidth candidate a maximum bandwidth that does not cause a packet to be divided for less than or equal to each of 1/n to n/n (wherein n is a natural number) of the maximum allocated bandwidth per single cycle for that service path terminating section. Note that, in addition to the above n number of bandwidths, the bandwidth request section 54 may also calculate as the requested bandwidth candidate the size of the first packet data inside the buffer memory section.

The bandwidth allocation calculation section 53 in FIG. 9 allocates the maximum bandwidth from out of the aforementioned requested bandwidth candidates for the relevant service path terminating sections in sequence from the service path terminating section that is highest in the allocation sequence. When the sum value of the allocated bandwidth exceeds the maximum value of the total allocated bandwidth, the bandwidth allocation to the service path terminating section that is last in the allocation sequence is adjusted such that the sum value of the allocated bandwidth is not more than the maximum value and not less than the minimum value of the total allocated bandwidth.

B. Operation

The operation of the present embodiment will now be described in detail.

In an optical network unit 16 packet data receiving sections 10a to 10c receive packet data from the corresponding request source; capacity counter sections 11a to 11c count the size of the packet data; and a packet management section 12 manages the sizes of the packet data inside buffer memory sections 13a to 13c for each packet. For each service path terminating section, the bandwidth request section 54 calculates as a requested bandwidth candidate a maximum bandwidth that does not cause a packet to be divided for less than or equal to each of 1/n to n/n (wherein n is a natural number) of the maximum allocated bandwidth per single cycle for that service path terminating section. Note that, in addition to the above n number of bandwidths, the bandwidth request section 54 may also calculate as the requested bandwidth candidate the size of the first packet data inside the buffer memory section. The packet data transmission section 15 transmits a bandwidth request signal that shows the result of the above calculation to an optical line terminal 51.

In the dynamic bandwidth allocation circuit 52 of the optical line terminal 51, the bandwidth request receiving section 20 receives and confirms a bandwidth request signal within a fixed bandwidth request receiving time. Next, based on the received bandwidth request signal, a bandwidth allocation calculation section 53 calculates an allocated bandwidth and transmission start time for each service path terminating section. The grant transmission section 23 then transmits grant signals that specify the allocated bandwidth and transmission start time to each service path terminating section. Thereafter, the above operation sequence is repeated in cycles.

Figure 11:
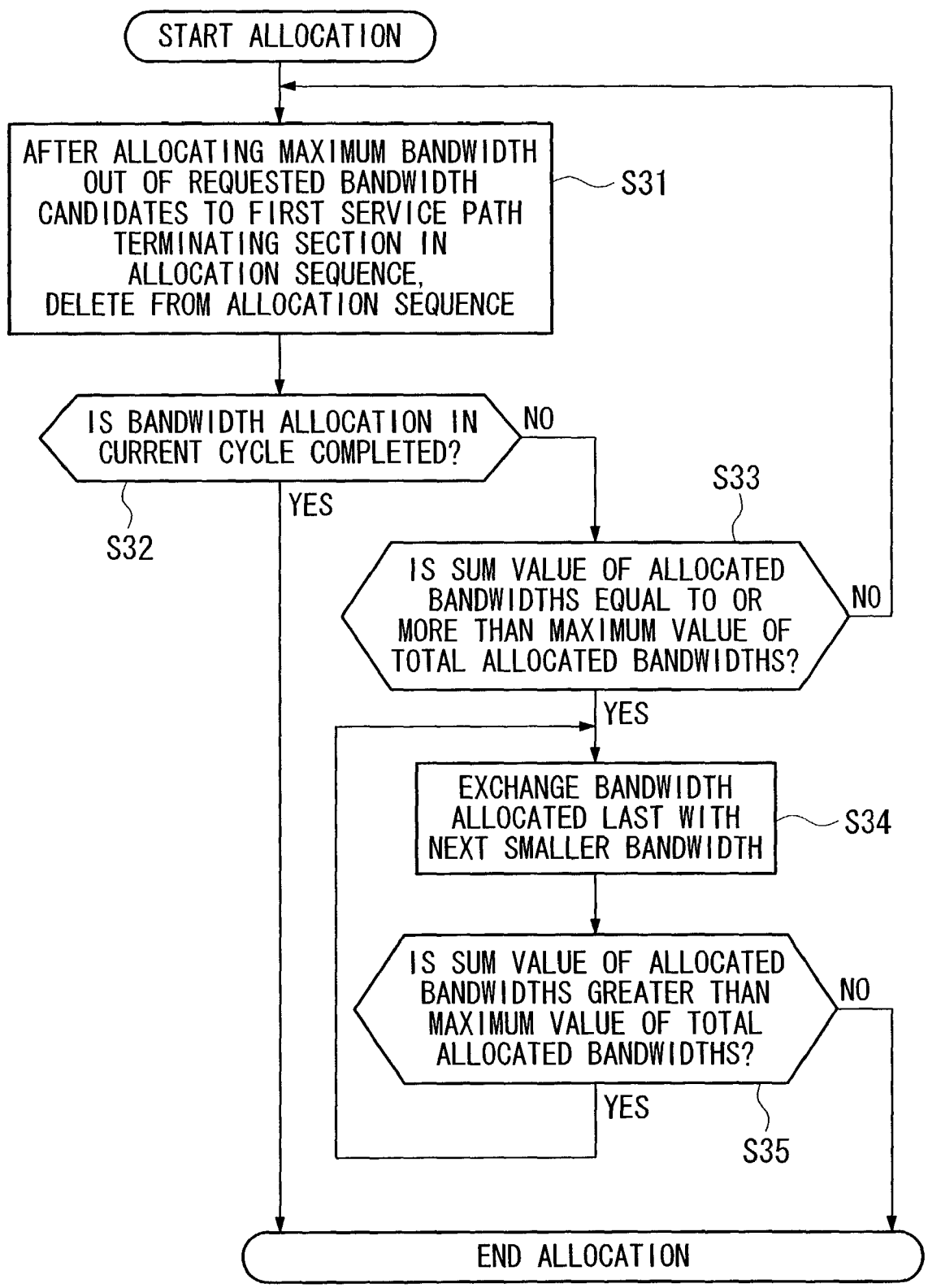
FIG. 11 is a flow chart showing an example of the operation of the bandwidth allocation calculation section according to the fourth embodiment of the present invention.
Figure 12:
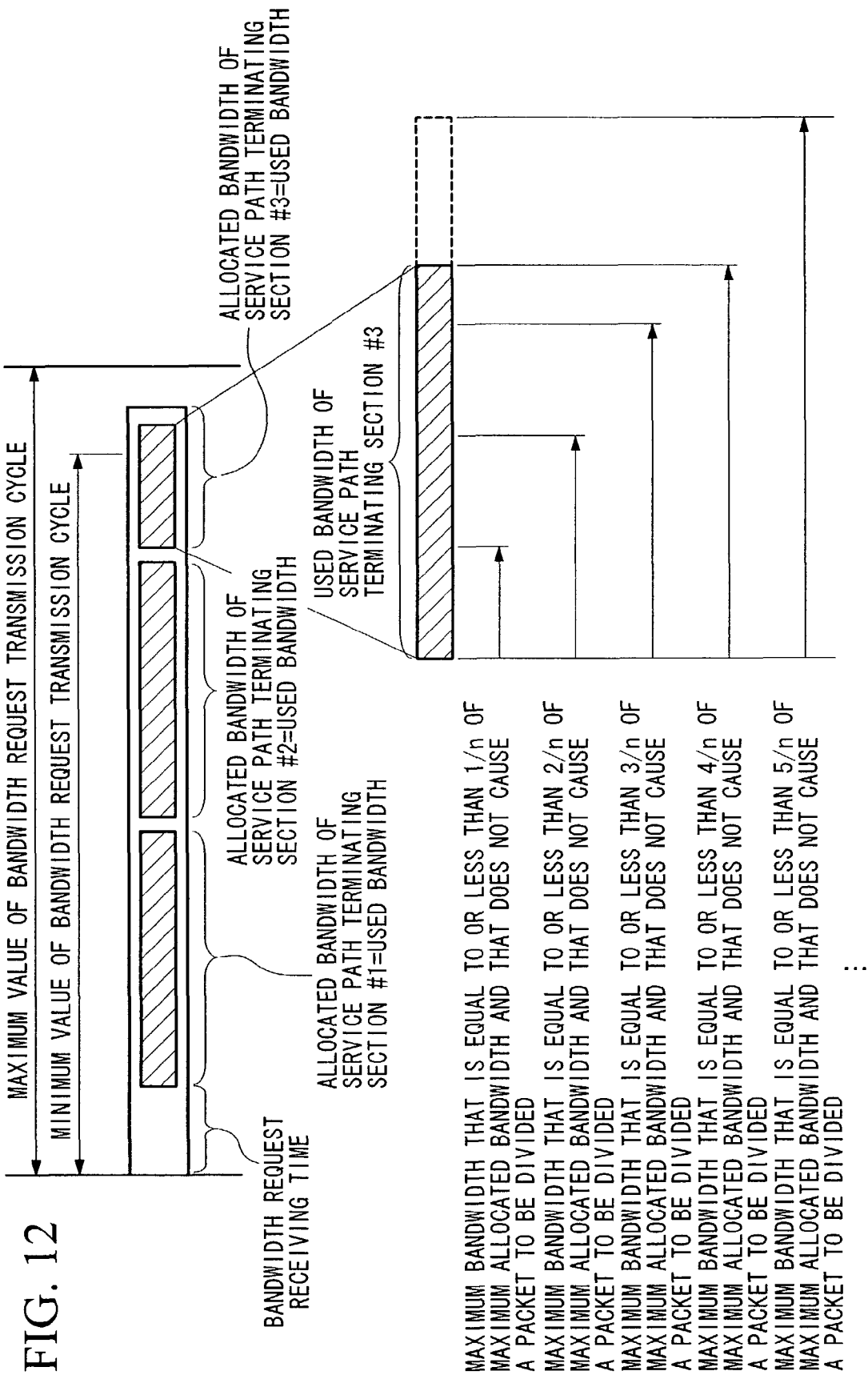
FIG. 12 is a conceptual view showing an example of a frame structure in a bandwidth allocation according to the fourth embodiment of the present invention.

FIG. 11 is a flow chart showing an example of the operation of the bandwidth allocation calculation section according to the present embodiment. FIG. 12 is a conceptual view showing an example of the frame structure of bandwidth allocation according to the present embodiment.

Firstly, after the maximum bandwidth from among the above described requested bandwidth candidates for the service path terminating section that is first in the allocation sequence have been allocated to the service path terminating section, this service path terminating section is deleted from the above allocation sequence (step S31). Next, it is determined whether or not the bandwidth allocations in the current cycle have been completed (step S32). If the bandwidth allocations have not been completed then it is determined whether or not the sum value of the allocated bandwidths is equal to or more than the maximum value of the total allocated bandwidth (step S33). Here, if the sum value of the allocated bandwidths is not equal to or more than the maximum value of the total allocated bandwidth, the routine returns to step S31 and the above described allocation is repeated.

If, however, the sum value of the allocated bandwidths is equal to or more than the maximum value of the total allocated bandwidth, then the bandwidth that was allocated last is exchanged with the next smaller bandwidth from among the above requested bandwidth candidates including the last allocated bandwidth (step S34). Next, it is determined whether or not the sum value of the allocated bandwidths is greater than the maximum value of the total allocated bandwidth (step S35). If the sum value of the allocated bandwidths is greater than the maximum value of the total allocated bandwidth, the routine returns to step S34, and the aforementioned next smaller bandwidth is exchanged with the next even smaller bandwidth from among the above requested bandwidth candidates including this bandwidth. If however, in step S35 the sum value of the allocated bandwidths is equal to or less than the maximum value of the total allocated bandwidth, the processing for the current cycle is ended.

Namely, the bandwidth allocation calculation section 53 allocates the maximum bandwidth (from out of the aforementioned requested bandwidth candidates for the relevant service path terminating sections) in sequence from the service path terminating section that is highest in the allocation sequence. When the sum value of the allocated bandwidth exceeds the maximum value of the total allocated bandwidth, the bandwidth allocation to the service path terminating section that is last in the allocation sequence is adjusted such that the sum value of the allocated bandwidth is not more than the maximum value and not less than the minimum value of the total allocated bandwidth. A grant signal specifying (together with the transmission start time) the decided allocated bandwidth is transmitted to each service path terminating section. Each service path terminating section transmits packet data for the allocated bandwidth at the transmission start time.

According to the present embodiment, a bandwidth request section calculates a maximum bandwidth that does not cause a packet to be divided for less than or equal to each of 1/n to n/n of the maximum allocated bandwidth per single cycle for that service path terminating section, and a bandwidth allocation calculation section selects one bandwidth from among the above requested bandwidth candidates for the service path terminating section that is last in the allocation sequence such that the sum value of the allocated bandwidth is not more than the maximum value and not less than the minimum value of the total allocated bandwidth. Therefore, it is possible to reduce the amount of unused bandwidth.

(5) Fifth Embodiment

The fifth embodiment of the present invention will now be described. In the present embodiment the maximum value of the total allocated bandwidth is set such that at least a minimum bandwidth (from among the above requested bandwidth candidates for the relevant service path terminating section) is assured for all service path terminating sections that have requested bandwidth in the current cycle. Other than the structure and operation of the bandwidth allocation calculation section, the structure and operation of the present embodiment are the same as the structure and operation of the fourth embodiment.

Figure 13:
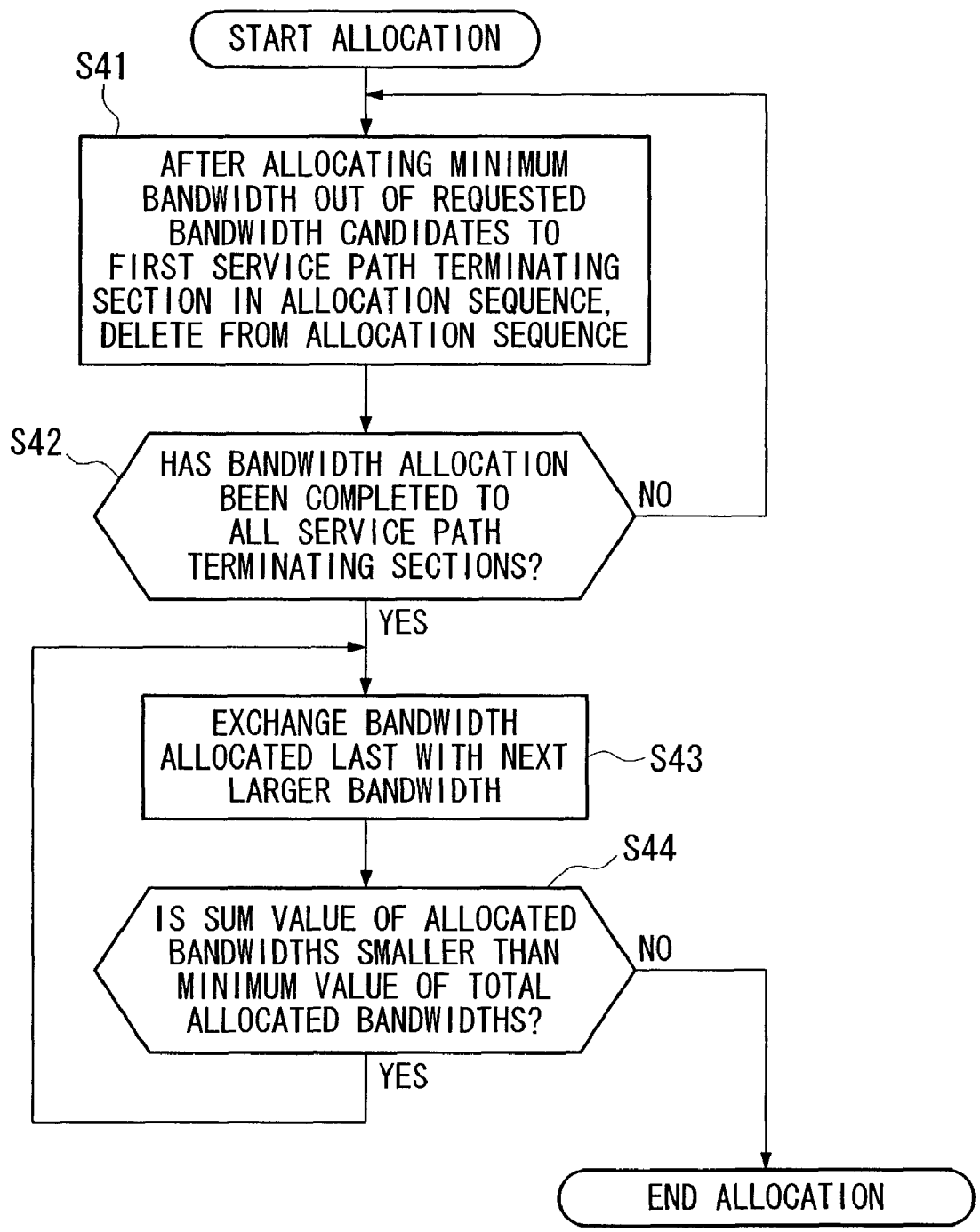
FIG. 13 is a flow chart showing an example of the operation of the bandwidth allocation calculation section according to the fifth embodiment of the present invention.

FIG. 13 is a flow chart showing an example of the operation of the bandwidth allocation calculation section according to the present embodiment. Firstly, after the minimum bandwidth from among the above described requested bandwidth candidates for the service path terminating section that is first in the allocation sequence have been allocated to the service path terminating section, this service path terminating section is deleted from the above allocation sequence (step S41). Next, it is determined whether or not the bandwidth allocation has been completed for all service path terminating sections (step S42). If this bandwidth allocation has not been completed then the routine returns to step S431 and the above described allocation is repeated.

If, however, the bandwidth allocation has been completed, then the bandwidth that was allocated last is exchanged with the next larger bandwidth from among the above requested bandwidth candidates including the last allocated bandwidth (step S43). Next, it is determined whether or not the sum value of the allocated bandwidths is smaller than the minimum value of the total allocated bandwidth (step S44). If the sum value of the allocated bandwidths is smaller than the minimum value of the total allocated bandwidth, the routine returns to step S43, and the aforementioned next larger bandwidth is exchanged with the next even larger bandwidth from among the above requested bandwidth candidates including this bandwidth. If, however, in step S44 the sum value of the allocated bandwidths is not more than the maximum value and not less than the minimum value of the total allocated bandwidth, the processing for the current cycle is ended.

Namely, the bandwidth allocation calculation section allocates the minimum bandwidth (from out of the aforementioned requested bandwidth candidates for the relevant service path terminating sections) in sequence from the service path terminating section that is highest in the allocation sequence. When the sum value of the allocated bandwidth does not reach the minimum value of the total allocated bandwidth, the bandwidth allocation to the service path terminating section that is last in the allocation sequence is adjusted such that the sum value of the allocated bandwidth is not more than the maximum value and not less than the minimum value of the total allocated bandwidth. A grant signal specifying (together with the transmission start time) the decided allocated bandwidth is transmitted to each service path terminating section. Each service path terminating section transmits packet data for the allocated bandwidth at the transmission start time.

According to the present embodiment, in addition to the effect achieved by the fourth embodiment (namely, the reducing of unused bandwidth), because at least a minimum bandwidth (out of the above requested bandwidth candidates) is allocated without fail to all of the service path terminating sections that have requested bandwidth, it is possible to keep the transmission cycle of grant signals short. Therefore, according to the present embodiment, it is possible to increase bandwidth efficiency and also to shorten delay time.

Note that, in order to simplify the algorithm, it is also possible to allocate to the service path terminating section that is last in the allocation sequence the maximum bandwidth that is equal to or less than the unused allocated bandwidth in the current cycle (namely, bandwidth obtained by subtracting the sum value of the bandwidth that has been allocated up until the penultimate service path terminating section in the allocation sequence from the maximum value of the total allocated bandwidth) from among the bandwidth request candidates for the relevant service path terminating section without performing any processing thereon.

(6) Sixth Embodiment

The sixth embodiment of the present invention will now be described. The sixth embodiment of the present invention is formed by combining the first and second embodiments.

(7) Seventh Embodiment

The seventh embodiment of the present invention will now be described. The seventh embodiment of the present invention is formed by combining the first and third embodiments.

(8) Eighth Embodiment

The eighth embodiment of the present invention will now be described. The eighth embodiment of the present invention is formed by combining the first and fourth embodiments.

(9) Ninth Embodiment

The ninth embodiment of the present invention will now be described. The ninth embodiment of the present invention is formed by combining the first and fifth embodiments.

(10) Tenth Embodiment

The tenth embodiment of the present invention will now be described. The tenth embodiment of the present invention is formed by combining the second and fourth embodiments.

(11) Eleventh Embodiment

The eleventh embodiment of the present invention will now be described. The eleventh embodiment of the present invention is formed by combining the second and fifth embodiments.

(12) Twelfth Embodiment

The twelfth embodiment of the present invention will now be described. The twelfth embodiment of the present invention is formed by combining the third and fourth embodiments.

(13) Thirteenth Embodiment

The thirteenth embodiment of the present invention will now be described.

The thirteenth embodiment of the present invention is formed by combining the third and fifth embodiments.

(14) Fourteenth Embodiment

The fourteenth embodiment of the present invention will now be described.

The fourteenth embodiment of the present invention is formed by combining the first, second, and fourth embodiments.

(15) Fifteenth Embodiment

The fifteenth embodiment of the present invention will now be described. The fifteenth embodiment of the present invention is formed by combining the first, second, and fifth embodiments.

(16) Sixteenth Embodiment

The sixteenth embodiment of the present invention will now be described.

The sixteenth embodiment of the present invention is formed by combining the first, third, and fourth embodiments.

(17) Seventeenth Embodiment

The seventeenth embodiment of the present invention will now be described

The seventeenth embodiment of the present invention is formed by combining the first, third, and fifth embodiments.

(18) Supplement

Note that in each of the above described embodiments the functions of the dynamic bandwidth allocation circuit (particularly of the bandwidth allocation calculation section) of the optical line terminal and the functions of the bandwidth request section of the optical network unit may be realized by executing a program stored in a storage section (not shown). This storage section may be formed by a hard disk or magneto-optical disk, or by non-volatile memory such as flash memory, or by volatile memory such as RAM, or alternatively by a combination of these. Moreover, when a program is transmitted via a network such as the Internet or by a telecommunication line such as a telephone line, this storage section may also be one that holds a program for a fixed time such as volatile memory (RAM) in a computer system such as a server and client.

Moreover, the above program may also be transmitted from a computer system storing the program in a storage device or the like to another computer system via a transmission medium or using a transmission wave in the transmission medium. Here, the "transmission medium" transmitting the program refers to a medium having the function of transmitting information, such as a network such as the Internet or a telecommunication line such as a telephone line. Moreover, the above program may also be one that is intended to perform a portion of the processing described above. Furthermore, the above program may also be a differential file (differential program) that performs the above described processing by being combined with programs that are prerecorded in the dynamic bandwidth allocation circuit of the optical line terminal (particularly the bandwidth allocation calculation section) and in the bandwidth request section of the optical network unit.

In the above description the embodiments of the present invention are described in detail with reference made to the drawings, however, the specific structure thereof is not limited to the above described embodiments and alterations in design and the like, insofar as they do not depart from the intent of the invention, are included within the scope of the invention.

What is claimed is:

1. A dynamic bandwidth allocation circuit, comprising
a bandwidth allocation calculation section that, based on bandwidth requested by each of a plurality of service path terminating sections that belong to any of a plurality of service classes that are classified according to delay size, allocates bandwidth to each of the service path terminating sections, wherein
in an operation cycle a maximum total value allocatable bandwidth is set and a maximum value of bandwidth that can be requested for each service class also is set and if the sum value of the bandwidths allocated for all service path terminating sections is greater than or equal to the maximum total value allocatable bandwidths then the allocation of the last bandwidth that was allocated for a service path terminating section is cancelled, and the service path terminating section whose allocation has been cancelled is set as the first service path terminating section in the allocation sequence in the next operation cycle.

2. The dynamic bandwidth allocation circuit according to claim 1, wherein the bandwidth allocation calculation section notifies a service path terminating section about an allocated bandwidth at an operation cycle that is different for each service class.

3. The dynamic bandwidth allocation circuit according to claim 2, wherein: the service classes comprise a low delay service class whose maximum delay is defined and a normal delay service class whose maximum delay is not defined;
and a maximum value of a bandwidth requested for a normal delay service class is larger than a maximum value of a bandwidth requested for a low delay service class; and the operation cycle for the normal delay service class is longer than the operation cycle for the low delay service class.

4. The dynamic bandwidth allocation circuit according to claim 3, wherein, when the bandwidth allocation calculation section allocates bandwidth to service path terminating sections belonging to the normal delay service class after having allocated bandwidth to all service path terminating sections belonging to the low delay service class, if the sum value of the allocated bandwidth is equal to or more than a predetermined value, a portion of the allocated bandwidth that exceeds the predetermined value is allocated in a subsequent operation cycle.

5. The dynamic bandwidth allocation circuit according to claim 1, wherein: the service classes comprise a low delay service class whose maximum delay is defined and a normal delay service class whose maximum delay is not defined; and a maximum value of a bandwidth requested for a normal delay service class is larger than a maximum value of a bandwidth requested for a low delay service class; and the operation cycle for the normal delay service class is longer than the operation cycle for the low delay service class.

6. The dynamic bandwidth allocation circuit according to claim 5, wherein, when the bandwidth allocation calculation section allocates bandwidth to service path terminating sections belonging to the normal delay service class after having allocated bandwidth to all service path terminating sections belonging to the low delay service class, if the sum value of the allocated bandwidth is equal to or more than a predetermined value, a portion of the allocated bandwidth that exceeds the predetermined value is allocated in a subsequent operation cycle.

7. A dynamic bandwidth allocation circuit, comprising:
an excess allocated bandwidth management section that stores excess allocated bandwidth that is bandwidth that has been allocated in excess to each of a plurality of service path terminating sections; and
a bandwidth allocation calculation section that allocates bandwidth to each service path terminating section based on the bandwidth indicated as variable length packets requested by each service path terminating section and an excess allocated bandwidth that is stored in the excess allocated bandwidth management section, and that also calculates excess allocated bandwidth based on allocated bandwidth and ideal bandwidth in a current operation cycle, wherein
the ideal bandwidth is calculated by subtracting excess allocated bandwidth of the previous cycle from a value obtained by proportionally distributing an ideal total allocated bandwidth using ratios of assured bandwidths of each service path terminating section that has requested bandwidth in the current operation cycle.

8. A dynamic bandwidth allocation circuit, comprising:
an excess allocated bandwidth management section that stores excess allocated bandwidth that is bandwidth that has been allocated in excess to each of a plurality of service path terminating sections;
an upstream bandwidth measuring section that measures actual transmitted bandwidth for each service path terminating section; and
a bandwidth allocation calculation section that allocates bandwidth to each service path terminating section based on the bandwidth, indicated as variable length packets, requested by each service path terminating section and the excess allocated bandwidth stored in the excess allocated bandwidth management section, and that also calculates excess allocated bandwidth based on actual transmitted bandwidth and allocated bandwidth in the previous operation cycle and allocated bandwidth and ideal bandwidth in the current operation cycle, wherein
the ideal bandwidth is calculated by subtracting excess allocated bandwidth of the previous operation cycle from a value obtained by proportionally distributing an ideal total allocated bandwidth using ratios of assured bandwidths of each service path terminating section that has requested bandwidth in the current operation cycle.

9. A dynamic bandwidth allocation circuit used in a PON system which communicates by variable length packets, comprising
a bandwidth allocation calculation section that, for each one of a plurality of service path terminating sections, selects one bandwidth from among a plurality of bandwidths requested by the service path terminating section such that the sum value of allocated bandwidths of the plurality of service path terminating sections is within a predetermined range; wherein
said plurality of bandwidths including, as a plurality of candidates for an allocated bandwidth, a plurality of different maximum bandwidths which allow one or more packets to be transmitted with none of the packets being divided, wherein said packets are stored in a service path terminating section and wherein the length of said packets may be different from each other.

10. The dynamic bandwidth allocation circuit according to claim 9, wherein the bandwidth allocation calculation section allocates in sequence starting from the service path terminating section that is highest in an allocation sequence the maximum bandwidth from among the plurality of bandwidths requested by the service path terminating section, and when the sum value of the allocated bandwidths is outside a predetermined range the bandwidth allocation calculation section adjusts bandwidth allocation to the service path terminating section that is last in the allocation sequence such that the sum value of the allocated bandwidths is within the predetermined range.

11. The dynamic bandwidth allocation circuit according to claim 9, wherein the bandwidth allocation calculation section allocates in sequence starting from the service path terminating section that is highest in an allocation sequence the minimum bandwidth from among the plurality of bandwidths requested by the service path terminating section, and when the sum value of the allocated bandwidths is outside a predetermined range the bandwidth allocation calculation section adjusts bandwidth allocation to the service path terminating section that is last in the allocation sequence such that the sum value of the allocated bandwidths is within the predetermined range.

12. A dynamic bandwidth allocation method, comprising
a bandwidth allocation calculation step that, based on bandwidth requested by each of a plurality of service path terminating sections that belong to any of a plurality of service classes that are classified according to delay size, allocates bandwidth to each of the service path terminating sections, wherein
in an operation cycle a maximum total value allocated bandwidth is set and a maximum value of bandwidth that can be requested for each service class also is set and if the sum value of the bandwidths allocated for all service path terminating sections is greater than or equal to the maximum total value allocatable bandwidths then the allocation of the last bandwidth that was allocated for a service path terminating section is cancelled, and the service path terminating section whose allocation has been cancelled is set as the first service path terminating section in the allocation sequence in the next operation cycle.

13. The dynamic bandwidth allocation method according to claim 12, wherein the bandwidth allocation calculation step notifies a service path terminating section about an allocated bandwidth at an operation cycle that is different for each service class.

14. The dynamic bandwidth allocation method according to claim 13, wherein: the service classes comprise a low delay service class whose maximum delay is defined and a normal delay service class whose maximum delay is not defined; and a maximum value of a bandwidth requested for a normal delay service class is larger than a maximum value of a bandwidth requested for a low delay service class;

and the operation cycle for the normal delay service class is longer than the operation cycle for the low delay service class.

15. The dynamic bandwidth allocation method according to claim 14, wherein, when the bandwidth allocation calculation step allocates bandwidth to service path terminating sections belonging to the normal delay service class after having allocated bandwidth to all service path terminating sections belonging to the low delay service class, if the sum value of the allocated bandwidth is equal to or more than a predetermined value, a portion of the allocated bandwidth that exceeds the predetermined value is allocated in a subsequent operation cycle.

16. The dynamic bandwidth allocation method according to claim 12, wherein: the service classes comprise a low delay service class whose maximum delay is defined and a normal delay service class whose maximum delay is not defined; and a maximum value of a bandwidth requested for a normal delay service class is larger than a maximum value of a bandwidth requested for a low delay service class; and the operation cycle for the normal delay service class is longer than the operation cycle for the low delay service class.

17. The dynamic bandwidth allocation method according to claim 16, wherein, when the bandwidth allocation calculation step allocates bandwidth to service path terminating sections belonging to the normal delay service class after having allocated bandwidth to all service path terminating sections belonging to the low delay service class, if the sum value of the allocated bandwidth is equal to or more than a predetermined value, a portion of the allocated bandwidth that exceeds the predetermined value is allocated in a subsequent operation cycle.

18. A dynamic bandwidth allocation method, comprising:
an excess allocated bandwidth management step that stores excess allocated bandwidth that is bandwidth that has been allocated in excess to each of a plurality of service path terminating sections; and
a bandwidth allocation calculation step that allocates bandwidth to each service path terminating section based on the bandwidth, indicated as variable length packets, requested by each service path terminating section and an excess allocated bandwidth stored in the excess allocated bandwidth management step, and that also calculates excess allocated bandwidth based on allocated bandwidth and ideal bandwidth in a current operation cycle, wherein
the ideal bandwidth is calculated by subtracting excess allocated bandwidth of the previous cycle from a value obtained by proportionally distributing an ideal total allocated bandwidth using ratios of assured bandwidths of each service path terminating section that has requested bandwidth in the current operation cycle.

19. A dynamic bandwidth allocation method, comprising:
an excess allocated bandwidth management step that stores excess allocated bandwidth that is bandwidth that has been allocated in excess to each of a plurality of service path terminating sections;
an upstream bandwidth measuring step that measures actual transmitted bandwidth for each service path terminating section; and
a bandwidth allocation calculation step that allocates bandwidth to each service path terminating section based on the bandwidth, indicated as variable length packets, requested by each service path terminating section and the excess allocated bandwidth stored in the excess allocated bandwidth management step, and that also calculates excess allocated bandwidth based on actual transmitted bandwidth and allocated bandwidth in the previous operation cycle and allocated bandwidth and ideal bandwidth in the current operation cycle, wherein
the ideal bandwidth is calculated by subtracting excess allocated bandwidth of the previous operation cycle from a value obtained by proportionally distributing an ideal total allocated bandwidth using ratios of assured bandwidths of each service path terminating section that has requested bandwidth in the current operation cycle.

20. A dynamic bandwidth allocation method used in a PON system which communicates by variable length packets, comprising
a bandwidth allocation calculation step that, for each one of a plurality of service path terminating sections, selects one bandwidth from among a plurality of bandwidths requested by the service path terminating section such that the sum value of allocated bandwidths of the plurality of service path terminating sections is within a predetermined range; wherein
said plurality of bandwidths including, as a plurality of candidates for an allocated bandwidth, a plurality of different maximum bandwidths which allow one or more packets to be transmitted with none of the packets being divided, wherein said packets are stored in a service path terminating section and wherein the length of said packets may be different from each other.

21. The dynamic bandwidth allocation method according to claim 20, wherein the bandwidth allocation calculation step allocates in sequence starting from the service path terminating section that is highest in an allocation sequence the maximum bandwidth from among the plurality of bandwidths requested by the service path terminating section, and when the sum value of the allocated bandwidths is outside a predetermined range the bandwidth allocation calculation step adjusts bandwidth allocation to the service path terminating section that is last in the allocation sequence such that the sum value of the allocated bandwidths is within the predetermined range.

22. The dynamic bandwidth allocation method according to claim 20, wherein the bandwidth allocation calculation step allocates in sequence starting from the service path terminating section that is highest in an allocation sequence the minimum bandwidth from among the plurality of bandwidths requested by the service path terminating section, and when the sum value of the allocated bandwidths is outside a predetermined range the bandwidth allocation calculation step adjusts bandwidth allocation to the service path terminating section that is last in the allocation sequence such that the sum value of the allocated bandwidths is within the predetermined range.

23. A computer-readable storage medium storing a program having computer-executable instructions when executed by a processor to execute on a computer a bandwidth allocation calculation step that, based on bandwidth requested by each of a plurality of service path terminating sections that belong to any of a plurality of service classes that are classified according to delay size, allocates bandwidth to each of the service path terminating sections, wherein
in an operation cycle a maximum total value allocatable bandwidth is set and a maximum value of bandwidth that can be requested for each service class also is set and if the sum value of the bandwidths allocated for all service path terminating sections is greater than or equal to the maximum total value of allocatable bandwidths then the allocation of the last bandwidth that was allocated for a service path terminating section is cancelled, and the service path terminating section whose allocation has been cancelled is set as the first service path terminating section in the allocation sequence in the next operation cycle.

24. The computer-readable storage medium according to claim 23, wherein the bandwidth allocation calculation step notifies a service path terminating section about an allocated bandwidth at an operation cycle that is different for each service class.

25. The computer-readable storage medium according to claim 24, wherein: the service classes comprise a low delay service class whose maximum delay is defined and a normal delay service class whose maximum delay is not defined; and a maximum value of a bandwidth requested for a normal delay service class is larger than a maximum value of a bandwidth requested for a low delay service class; and the operation cycle for the normal delay service class is longer than the cycle for the low delay service operation class.

26. The computer-readable storage medium according to claim 25, wherein, when the bandwidth allocation calculation step allocates bandwidth to service path terminating sections belonging to the normal delay service class after having allocated bandwidth to all service path terminating sections belonging to the low delay service class, if the sum value of the allocated bandwidth is equal to or more than a predetermined value, a portion of the allocated bandwidth that exceeds the predetermined value is allocated in a subsequent operation cycle.

27. The computer-readable storage medium according to claim 23, wherein: the service classes comprise a low delay service class whose maximum delay is defined and a normal delay service class whose maximum delay is not defined; and a maximum value of a bandwidth requested for a normal delay service class is larger than a maximum value of a bandwidth requested for a low delay service class; and the cycle for the normal delay service class is longer than the cycle for the low delay service class.

28. The computer-readable storage medium according to claim 27, wherein, when the bandwidth allocation calculation step allocates bandwidth to service path terminating sections belonging to the normal delay service class after having allocated bandwidth to all service path terminating sections belonging to the low delay service class, if the sum value of the allocated bandwidth is equal to or more than a predetermined value, a portion of the allocated bandwidth that exceeds the predetermined value is allocated in a subsequent operation cycle.

29. A computer-readable storage medium storing a program having computer-executable instructions when executed by a processor to execute on a computer:
an excess allocated bandwidth management step that stores excess allocated bandwidth that is bandwidth that has been allocated in excess to each of a plurality of service path terminating sections; and
a bandwidth allocation calculation step that allocates bandwidth to each service path terminating section based on the bandwidth, indicated as variable length packets, requested by each service path terminating section and an excess allocated bandwidth stored in the excess allocated bandwidth management step, and that also calculates excess allocated bandwidth based on allocated bandwidth and ideal bandwidth in a current operation cycle, wherein
the ideal bandwidth is calculated by subtracting excess allocated bandwidth of the previous cycle from a value obtained by proportionally distributing an ideal total allocated bandwidth using ratios of assured bandwidths of each service path terminating section that has requested bandwidth in the current operation cycle.

30. The computer-readable storage medium on which is recorded a program that executes on a computer:
an excess allocated bandwidth management step that stores excess allocated bandwidth that is bandwidth that has been allocated in excess to each of a plurality of service path terminating sections;
an upstream bandwidth measuring step that measures actual transmitted bandwidth for each service path terminating section; and
a bandwidth allocation calculation step that allocates bandwidth to each service path terminating section based on the bandwidth, indicated as variable length packets, requested by each service path terminating section and the excess allocated bandwidth stored in the excess allocated bandwidth management step, and that also calculates excess allocated bandwidth based on actual transmitted bandwidth and allocated bandwidth in the previous operation cycle and allocated bandwidth and ideal bandwidth in the current operation cycle, wherein
the ideal bandwidth is calculated by subtracting excess allocated bandwidth of the previous operation cycle from a value obtained by proportionally distributing an ideal total allocated bandwidth using ratios of assured bandwidths of each service path terminating section that has requested bandwidth in the current operation cycle.

31. A computer storage medium storing a program having computer-executable instructions used in a PON system which communicates by variable length packets, which when executed by a processor to execute on a computer:
a bandwidth allocation calculation step that, for each one of a plurality of service path terminating sections, selects one bandwidth from among a plurality of bandwidths requested by the service path terminating section such that the sum value of allocated bandwidths of the plurality of service path terminating sections is within a predetermined range; wherein
said plurality of bandwidths including, as a plurality of candidates for an allocated bandwidth, a plurality of different maximum bandwidths which allow one or more packets to be transmitted with none of the packets being divided, wherein said packets are stored in a service path terminating section and wherein the length of said packets may be different from each other.

32. The computer-readable storage medium according to claim 31, wherein the bandwidth allocation calculation step allocates in sequence starting from the service path terminating section that is highest in an allocation sequence the maximum bandwidth from among the plurality of bandwidths requested by the service path terminating section, and when the sum value of the allocated bandwidths is outside a predetermined range the bandwidth allocation calculation step adjusts bandwidth allocation to the service path terminating section that is last in the allocation sequence such that the sum value of the allocated bandwidths is within the predetermined range.

33. The computer-readable storage medium according to claim 31, wherein the bandwidth allocation calculation step allocates in sequence starting from the service path terminating section that is highest in an allocation sequence the minimum bandwidth from among the plurality of bandwidths requested by the service path terminating section, and when the sum value of the allocated bandwidths is outside a predetermined range the bandwidth allocation calculation step adjusts bandwidth allocation to the service path terminating section that is last in the allocation sequence such that the sum value of the allocated bandwidths is within the predetermined range.

34. An optical network unit in a PON system which communicates by variable length packets in which a plurality of optical network units and a single optical line terminal are connected by PON topology, and the optical line terminal includes a dynamic bandwidth allocation circuit that allocates upstream bandwidths to the optical network units, the optical network unit comprising:

a service path terminating section which transmits, to the dynamic bandwidth allocation circuit a bandwidth request signal of a plurality of candidates for a bandwidth to be allocated to the service path terminating section, the bandwidth request signal indicating a plurality of different maximum bandwidths which allow one or more packets to be transmitted with none of the packets being divided, and if one of the maximum bandwidths indicated by the transmitted bandwidth request signal has been allocated by the dynamic bandwidth allocation circuit, transmits upstream data for the allocated maximum bandwidth.

35. A PON system which communicates by variable length packets comprising:

a plurality of optical network units each including a service path terminating section; and a single optical line terminal connected to the optical network units by PON topology, and including a dynamic bandwidth allocation circuit which allocates upstream bandwidths for the optical network units, wherein the dynamic bandwidth allocation circuit receives a bandwidth request signal from each service path terminating section in each of the optical network units, each bandwidth request signal asking for a plurality of candidates for bandwidth to be allocated to each service path terminating section, the bandwidth request signal from each service path terminating section indicating a plurality of different maximum bandwidths which allow one or more packets to be transmitted by the service path terminating section with none of the packets being divided, and the dynamic bandwidth allocation circuit selects, for each service path terminating section, one bandwidth from among the maximum bandwidths requested by each service path terminating section such that the sum of bandwidths allocated to service path terminating sections is within a predetermined range, and an optical network unit for transmitting for each service path terminating section in the optical network unit, the bandwidth request signal to the dynamic bandwidth allocation circuit, and if one of the maximum bandwidths indicated by the transmitted bandwidth request signal has been allocated by the dynamic bandwidth allocation circuit, the optical network unit transmits upstream data for the allocated maximum bandwidth.

* * * * *